United States Patent

Mizukawa et al.

(10) Patent No.: US 7,579,124 B2
(45) Date of Patent: Aug. 25, 2009

(54) COLORED CURABLE COMPOSITION, COLOR FILTER AND MANUFACTURING METHOD THEREOF

(75) Inventors: Yuki Mizukawa, Kanagawa (JP); Toru Fujimori, Shizuoka-ken (JP); Nobuo Suzuki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 816 days.

(21) Appl. No.: 11/002,297

(22) Filed: Dec. 3, 2004

(65) Prior Publication Data

US 2005/0136343 A1   Jun. 23, 2005

(30) Foreign Application Priority Data

Dec. 3, 2003 (JP) ............................. 2003-404711
Aug. 2, 2004 (JP) ............................. 2004-225852

(51) Int. Cl.
*G02B 5/20* (2006.01)
*G02F 7/00* (2006.01)

(52) U.S. Cl. ........................................ 430/7; 430/270.1

(58) Field of Classification Search ........................ None
See application file for complete search history.

(56) References Cited

U.S. PATENT DOCUMENTS 5,122,611 A   6/1992   Tanaka et al.

FOREIGN PATENT DOCUMENTS

| EP | 0 564 168 B1 | 10/1993 |
|---|---|---|
| EP | 0 947 858 A1 | 10/1999 |
| EP | 1 168 047 A1 | 1/2002 |
| EP | 1 168 048 A1 | 1/2002 |
| JP | 1-102469 A | 4/1989 |
| JP | 1-152499 A | 6/1989 |
| JP | 2-181704 A | 7/1990 |
| JP | 2-199403 A | 8/1990 |
| JP | 4-76062 A | 3/1992 |
| JP | 5-273411 A | 10/1993 |
| JP | 6-75375 A | 3/1994 |
| JP | 6-184482 A | 7/1994 |
| JP | 7-013014 A * | 1/1995 |
| JP | 7-140654 A | 6/1995 |
| JP | 7-111485 B2 | 11/1995 |
| JP | 2001-127121 A * | 10/2001 |
| JP | 2002-14221 A | 1/2002 |
| JP | 2002-14222 A | 1/2002 |
| JP | 2002-256164 A | 9/2002 |

OTHER PUBLICATIONS

Computer-generated translation of JP 2001-127121 (Oct. 2001).*
Computer-generated translation of JP 7-013014 (Jan. 1995).*

* cited by examiner

*Primary Examiner*—John A. McPherson
(74) *Attorney, Agent, or Firm*—Sughrue Mion, PLLC

(57) ABSTRACT

The present invention provides a colored curable composition including a dye represented by the following formula (I), a color filter prepared by using the colored curable composition, and a method for manufacturing the color filter.

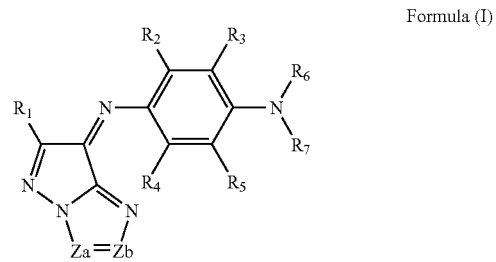

Formula (I)

18 Claims, No Drawings

COLORED CURABLE COMPOSITION, COLOR FILTER AND MANUFACTURING METHOD THEREOF

CROSS-REFERENCE TO RELATED APPLICATION

This application claims priority under 35 USC 119 from Japanese Patent Application Nos. 2003-404711 and 2004-225852, the disclosures of which are incorporated by reference herein.

BACKGROUND OF THE INVENTION

1. Field of the Invention

The present invention relates to a colored curable composition favorable for forming a color filter for use in liquid crystal display elements (LCD) and solid-state image pickup elements (for example, CCD and CMOS), a color filter using the colored curable composition, and a method for manufacturing the color filter.

2. Description of the Related Art

Examples of known color filters formed on an element for enabling a solid-state image pickup element or liquid crystal display element to display colors include, for example, color filters comprising a yellow filter layer, a magenta filter layer, and a cyan filter layer formed in adjoining relation to each other on a same plane on a substrate, and color filters comprising a red filter layer, a green filter layer, and a blue filter layer also formed in adjoining relation to each other on a same plane on a substrate. The filter layers comprise striped or mosaic patterns. Various methods for forming color filters have been proposed, with a color resist method having been widely used wherein a step for patterning a pigment-containing photosensitive resin composition by exposure and development is repeated a number of times required.

In the color resist method (hereinafter referred to as pigment dispersion method), pigment is dispersed in a variety of photosensitive compositions to prepare a colored radiation-sensitive composition, after which a color filter is manufactured through photolithography using the composition. This method is suitable for manufacturing a color filter for a large screen, precise-color display, since the color filter is stable with respect to light, heat and other influence due to the use of the pigment, and positional accuracy is sufficient as a result of patterning by photolithography.

The method for manufacturing a color filter with the above pigment dispersion method comprises the steps of applying the radiation sensitive composition on a glass substrate using a spin coater or roll coater to form a coating film, obtaining colored pixels by pattern exposure and development of the coating film, and repeating this procedure for every colors to obtain a color filter. Regarding the pigment dispersion method, a negative photosensitive composition has been disclosed which is prepared by using an alkali-soluble resin, a photopolymerizable monomer, and a photopolymerization initiator (see, for example, Japanese Patent Application Laid-Open (JP-A) Nos. 1-102469, 1-152499, 2-181704, 2-199403, 4-76062, 5-273411, 6-184482 and 7-140654).

Color filters for solid-state image pickup elements have been required to be finer and more precise in recent years. However, since conventional pigment dispersion methods involve the problem of poor image resolution and irregular coloring due to coarse pigment particles, such methods are not suitable for uses requiring a fine pattern as in a solid-state image pickup element. Use of a dye has been proposed for solving these problems, and positive-type photosensitive compositions have been disclosed (for example, see JP-A Nos. 6-75375 and 2002-14221, and Japanese Patent Application Publication (JP-B) No. 7-111485).

However, the dye-containing colored curable compositions also involve the following problems and a need for further improvement is required.

(1) Since dye is usually poor in such characteristics as heat resistance and light fastness compared to pigment, more improvement in durability is required.

(2) A large quantity of dye needs to be added when the dye has a low molar absorbance coefficient. This forces the proportion of other components such as a polymerizable compound, binder, and photopolymerization initiator in the colored curable composition to be reduced. The result is that curability, heat resistance after curing, and developability of non-cured portions is deteriorated, and therefore improvement is needed.

(3) The dye often interacts with other components in the colored curable composition, making it difficult to control cured portions and developablity (solubility) of cured portions, again requiring improvement.

In particular, durability has not been satisfactory in dyes used in the conventional photosensitive compositions as described above, and further, it was difficult to add the dye to the photosensitive composition in high concentration due to low solubility of the dye in the composition. Improvement had been desired for these properties.

A violet pigment has been used in a blue filter of the color filter (for example, see JP-A No. 2002-14222). However, heat resistance and light fastness of the violet pigment used in that patent is insufficient and improvements in these properties are required. Similarly, improvement in durability of the magenta pigment used in the magenta filter layer of the color filter comprising the yellow filter layer, magenta filter layer, and cyan filter layer has been also desired. Color filters containing a pyrazoroazole-base azomethin pigment have been disclosed (see, for example, JP-A No. 2002-256164), however, these dyes also require improvement in solubility and durability.

SUMMARY OF THE INVENTION

The present invention is to provide a colored curable composition having high sensitivity, high resolution, and high transmittance, and which is excellent in heat resistance and light fastness, and a color filter using the colored curable composition.

The inventors of the present invention have carried out detailed research on various dye compounds having good hues and high durability against light and heat, and found that a dye having a certain structure is useful for improving durability of characteristics such as heat resistance and light fastness. The colored curable composition, color filter, and the manufacturing method thereof described below have been provided based on the discovery above.

A first aspect of the invention is to provide a colored curable composition comprising a dye represented by the following formula (I):

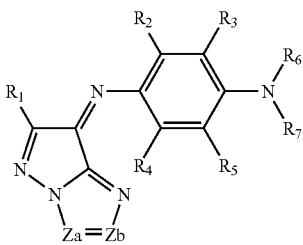

Formula (I)

wherein $R_1$ represents a hydrogen atom or a substituent excluding perfluoroalkyl carbonylamino groups, sulfonamide groups, and sulfamoyl groups; $R_2$ to $R_5$ each independently represent a hydrogen atom or a substituent; $R_6$ and $R_7$ each independently represent an alkyl group, an alkenyl group, or an aryl group; Za and Zb each independently represent —N= or —C($R_8$)=; $R_8$ represents a hydrogen atom, an alkyl group, an aryl group, or a heterocyclic group; and $R_2$ and $R_3$, $R_3$ and $R_6$, $R_4$ and $R_5$, $R_5$ and $R_7$, and/or $R_6$ and $R_7$ may be linked with each other to each independently form a 5-membered, 6-membered, or 7-membered ring.

A second aspect of the invention is to provide a color filter prepared by using the colored curable composition according to the first aspect.

A third aspect of the invention is to provide a method for manufacturing the color filter comprising applying the colored curable composition according to the first aspect of the invention on a substrate, exposing the colored curable composition to light through a mask, and developing the colored curable composition to form a pattern.

DETAILED DESCRIPTION OF THE INVENTION

The colored curable composition, color filter, and the method for manufacturing the color filter of the present invention will be described in detail below.

[Colored Curable Composition]

The colored curable composition of the invention contains a pigment represented by formula (I) below, and preferably further contains a binder, a radiation sensitive compound, and a polymerizable monomer. The composition may usually further include a solvent, and other components such as a cross-linking agent if necessary.

Compound Represented by Formula (I)

The colored curable composition of the invention contains at least one of the dyes represented by formula (I). This dye has a good hue, a fluid preparation or coating film thereof being excellent in storability without precipitation over time, and the dye particularly has high durability against heat and light.

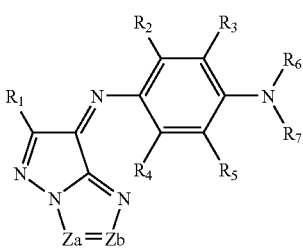

Formula (I)

In the formula, $R_1$ represents a hydrogen atom or a substituent (excluding a perfluoroalkyl carbonylamino group, sulfonamide group and sulfamoyl group); $R_2$ to $R_5$ each independently represents a hydrogen atom or a substituent; $R_6$ and $R_7$ each independently represents an alkyl group, an alkenyl group, or an aryl group; Za and Zb each independently represents —N= or —C($R_8$)=; $R_8$ represents a hydrogen atom, an alkyl group, an aryl group, or a heterocyclic group; and $R_2$ and $R_3$, $R_3$ and $R_6$, $R_4$ and $R_5$, $R_5$ and $R_7$, and/or $R_6$ and $R_7$ may be linked with each other to each independently form a 5-membered, 6-membered or 7-membered ring.

$R_1$ to $R_6$, Za, and Zb in formula (I) will be described in detail below.

$R_1$ in formula (I) represents a hydrogen atom or a substituent. When $R_1$ represents a substituent, $R_1$ represents a halogen atom (for example fluorine, chlorine or bromine atom), an alkyl group (preferably a linear, branched, or cyclic alkyl group with a carbon number of 1 to 48 such as a methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbonyl, or 1-adamantyl group), an alkenyl group (preferably the alkenyl group with a carbon number of 2 to 48 such as a vinyl, allyl, or 3-butene-1-yl group), an aryl group (preferably the aryl group with a carbon number of 6 to 48 such as a phenyl or naphthyl group), a heterocyclic group (preferably the heterocyclic group with a carbon number of 1 to 32 such as a 2-thyenyl, 4-pyridil, 2-furyl, 2-pyrimidinyl, 1-pyridyl, 2-benzothiazolyl, 1-imidazolyl, 1-pyrazolyl, or benzotriazole-1-yl groups), a silyl group (preferably the silyl group with a carbon number of 3 to 38 such as a trimethyl silyl, triethyl silyl, tributyl silyl, t-butyldimethyl silyl, or t-hexyldimethyl silyl group), a hydroxyl group, a cyano group, a nitro group, an alkoxy group (preferably the alkoxy group with a carbon number of 1 to 48 such as a methoxy, ethoxy, 1-butoxy, 2-butoxy, isopropoxy, t-butoxy, or dodecyloxy group, or a cycloalkyloxy group such as a cyclopentyloxy or cyclohexyloxy group), an aryloxy group (preferably the aryloxy group with a carbon number of 6 to 48 such as a phenoxy or 1-naphthoxy group), a heterocyclicoxy group (preferably the heterocyclicoxy group with a carbon number of 1 to 32 such as a 1-phenyltetrazole-5-oxy or 2-tetrahydropyranyloxy group), a silyloxy group (preferably the silyloxy group with a carbon number of 1 to 32 such as a trimethylsilyloxy, t-butyldimethylsilyloxy, or diphenylmethylsilyloxy group), an acyloxy group (preferably the acyloxy group with a carbon number of 2 to 48 such as an acetoxy, pivaloyloxy, benzoyloxy, or dodecanoyloxy group), an alkoxycarbonyloxy group (preferably the alkoxycarbonyloxy group with a carbon number of 2 to 48 such as an ethoxycarbonyloxy or t-butoxycarbonyloxy group, or a cycloalkyloxy carbonyloxy group such as a cyclohexyloxy carbonyloxy group), an aryloxycarbonyloxy group (preferably the aryloxycarbonyloxy group with a carbon number of 7 to 32 such as a phenoxycarbonyloxy group), a carbamoyloxy group (preferably the carbamoyloxy group with a carbon number of 1 to 48 such as an N,N-dimethylcarbamoyloxy, N-butylcarbamoyloxy, N-phenylcarbamoyloxy or N-ethyl-N-phenylcarbamoyloxy group), a sulfamoyloxy group (preferably the sulfamoyloxy group with a carbon number of 1 to 32 such as an N,N-diethylsulfamoyloxy or N-propylsulfamoyloxy group), an alkylsulfonyloxy group (preferably the alkylsulfonyloxy group with a carbon number of 1 to 38 such as a methylsulfonyloxy, hexadecylsulfonyloxy or cyclohexylsulfonyloxy group), an arylsulfonyloxy group (preferably the arylsulfonyloxy group with a carbon number of 6 to 32 such as a phenylsulfonyloxy group), an acyl group (preferably the acyl group with a carbon number of 1 to 48 such as a formyl, acetyl, pivaloyl, benzoyl, tetradecanoyl or cyclohexanoyl group), an alkoxycarbonyl group (preferably the alkoxycarbonyl group with a carbon number of 2 to 48 such as a methoxycarbonyl, ethoxycarbonyl, octadecyloxycarbonyl or cyclohexyloxycarbonyl group), an aryloxycarbonyl group (preferably the aryloxycarbonyl group with a carbon number of 7 to 32 such as a phenoxycarbonyl group), a carbamoyl group (preferably the carbamoyl group with a carbon number of 1 to 48 such as a carbamoyl, N,N-diethylcarbamoyl, N-ethyl-N-octylcarbamoyl, N,N-dibytylcarbamoyl, N-propylcarbamoyl, N-phenylcarbamoyl, N-methyl-N-phenylcarbamoyl or N,N-dicyclohexyl carbamoyl group), an amino group (preferably the amino group with a carbon number of not larger than 32 such as an amino, methylamino, N,N-dibutylamino, tetradecylamino, 2-ethylhexylamino or cyclohexylamino group), an anilino group (preferably the anilino group with a carbon number of 6 to 32 such as an anilino and N-methylanilino group), a heterocyclic amino group (preferably the heterocyclic amino group with a carbon number of 1 to 32 such as a 4-pyridylamino group), a carbonamide group (preferably the carbonamide group with a carbon number of 1 to 32 such as an acetamide, benzamide, pivaloylamide, cyclohexane amide, adamantylamide or 2-ethylhexane amide group excluding perfluoroalkylcarbonyl amide groups), a ureido group (preferably the ureido group with a carbon number of 1 to 32 such as an ureido, N,N-dimethylureido or N-phenylureido group), imide group (preferably the imide group with a carbon number of not larger than 10 such as an N-succimide or N-phthalimide group), an alkoxycarbonylamino group (preferably the alkoxycarbonylamino group with a carbon number of 2 to 48 such as a methoxycarbonylamino, ethoxycarbonylamino, t-butoxycarbonylamino, octadecyloxycarbonylamino or cyclohexyloxycarbonylamino group), an aryloxycarbonylamino group (preferably the aryloxycarbonylamino group with a carbon number of 7 to 32 such as a phenoxycarbonylamino group), an azo group (preferably the azo group with a carbon number of 1 to 32 such as a phenylazo or 3-pyrazolylazo group), an alkylthio group (preferably the alkylthio group with a carbon number of 1 to 48 such as a methylthio, ethylthio, octylthio or cyclohexylthio group), an arylthio group (preferably the arylthio group with a carbon number of 6 to 48 such as a phenylthio group), a heterocyclic thio group (preferably the heterocyclic thio group with a carbon number of 1 to 32 such as a 2-benzothiazolylthio, 2-pyridylthio or 1-phenyltetrazolylthio group), an alkylsulfinyl group (preferably the alkylsulfinyl group with a carbon number of 1 to 32 such as a dodecanesulfinyl group), an arylsulfinyl group with a carbon number of 6 to 32 such as a phenylsulfinyl group), an alkylsulfonyl group (preferably the alkylsulfonyl group with a carbon number of 1 to 48 such as a methylsulfonyl, ethylsulfonyl, propylsulfonyl, butylsulfonyl, isopropylsulfonyl, 2-ethylhexylsulfonyl, hexadecylsulfonyl, octylsulfonyl or cyclohexylsulfonyl group), an arylsulfonyl group (preferably the arylsulfonyl group with a carbon number of 6 to 48 such as a phenylsulfonyl or 1-naphthylsulfonyl group), a sulfamoyl group (preferably the sulfamoyl group with a carbon number of not larger than 32 such as a sulfamoyl, N,N-dipropyl sulfamoyl, N-ethyl-N-dodecylsulfamoyl, N-ethyl-N-phenylsulfamoyl or N-cyclohexylsulfamoyl group), a sulfo group, a phosphonyl group (preferably the phosphonyl group with a carbon number of 1 to 32 such as a phenoxyphosphonyl, octyloxyphosphonyl or phenylphosphonyl group), or a phosphinoylamino group (preferably the phosphinoylamino group with a carbon number of 1 to 32 such as a diethoxyphosphinoylamino or dioctylphosphinoylamino group).

When $R_1$ is a group which can be substituted, $R_1$ may be substituted by any of the substituents described in $R_1$ as well as a sulfonamide or sulfamoylamino group. When $R_1$ has two or more substituents, they may be the same or different.

$R_2$ to $R_5$ in formula (I) each independently represent a hydrogen atom or a substituent, and when any of $R_2$ to $R_5$ represents a substituent, it represents any of the substituents described in $R_1$, a perfluoroalkyl carbonylamino group, a sulfonamide group (preferably a sulfonamide group with a carbon number of 1 to 48 such as a methanesulfoneamide, butanesulfoneamide, benzenesulfoneamide, hexadecanesulfoneamide, or cyclohexanesulfoneamide group), or a sulfamoylamino group (preferably a sulfamoylamino group with a carbon number of 1 to 48 such as an N,N-dipropylsulfamoylamino or N-ethyl-N-dodecylsulfamoylamino group).

When any of $R_2$ to $R_5$ in formula (I) is a group which can be substituted, it may be substituted by any of the substituents described in $R_2$ to $R_5$. When any of $R_2$ to $R_5$ has two or more substituents, the substituents may be the same or different.

$R_2$ and $R_3$, $R_3$ and $R_6$, $R_4$ and $R_5$, $R_5$ and $R_7$, and/or $R_6$ and $R_7$ may be linked with each other to form a 5-membered, 6-membered, or 7-membered ring. The 5-membered, 6-membered, or 7-membered ring formed by binding of $R_2$ and $R_3$, $R_3$ and $R_6$, $R_4$ and $R_5$, $R_5$ and $R_7$ and/or $R_6$ and $R_7$ may be substituted by any of the substituents described in $R_2$ to $R_5$ When the 5-membered, 6-membered, or 7-membered ring has two or more substituents, the substituents may be the same or different.

$R_6$ and $R_7$ in formula (I) each independently represent an alkyl group, an alkenyl group, an aryl group, or a heterocyclic group, and the preferable ranges of the alkyl group, alkenyl group, aryl group, and heterocyclic group are the same as the ranges of the alkyl group, alkenyl group, aryl group, and heterocyclic group described in $R_1$.

When any of $R_6$ and $R_7$ in formula (I) is a group which can be further substituted, it may be substituted by any of the substituents described in $R_2$ to $R_5$. When any of $R_6$ and $R_7$ have two or more substituents, the substituents may be the same or different.

Za and Zb in formula (I) each independently represents =N— or —C($R_8$)=, and $R_8$ represents a hydrogen atom or a substituent.

When $R_8$ represents a substituent, $R_8$ has the same meaning as the substituent described in $R_2$ to $R_5$. When $R_8$ is a group which can be further substituted, it may be substituted by any of the substituents described in $R_2$ to $R_5$. When $R_8$ has two or more substituents, they may be the same or different.

The dye represented by formula (I) is preferably represented by formula (II) below.

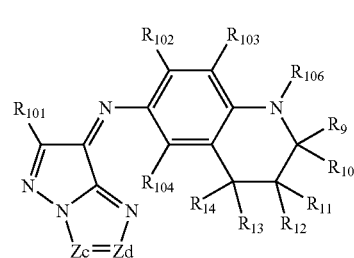

Formula (II)

In the formula, $R_{101}$ has the same meaning as $R_1$ in formula (I), $R_{102}$ to $R_{104}$ have the same meanings as $R_2$ to $R_4$, respectively, in formula (I), and $R_{106}$ has the same meaning as $R_6$ in formula (I). $R_9$ to $R_{14}$ each independently represents a hydrogen atom or a substituent. Zc and Zd have the same meanings as Za and Zb, respectively, in formula (I).

$R_9$ to $R_{14}$, $R_{101}$ to $R_{104}$, $R_{106}$, Zc, and Zd in formula (II) will be described in detail below.

$R_9$ to $R_{14}$ in formula (II) each independently represent a hydrogen atom or a substituent, and the preferable range of the substituents represented by $R_9$ to $R_{14}$ is the same as that of the substituents described in $R_2$ to $R_5$.

When any of $R_9$ to $R_{14}$ is a group which can be further substituted, it may be substituted by any of the substituents described in $R_2$ to $R_5$. When any of $R_9$ to $R_{14}$ have two or more substituents, these substituents may be the same or different.

$R_{102}$ and $R_{103}$, $R_{103}$ and $R_{106}$, $R_{106}$ and $R_9$, and $R_{104}$ and $R_{14}$ may be linked to one another to form a 5-membered, 6-membered, or 7-membered ring.

$R_{101}$, in formula (II) has the same meaning as $R_1$ in formula (I). When $R_{101}$ is a group which can be further substituted, it may be substituted with any of the substituents described in $R_2$ to $R_5$. When $R_{101}$ has two or more substituents, they may be the same or different.

$R_{102}$ in formula (II) has the same meaning as $R_2$ in formula (I), $R_{103}$ in formula (II) has the same meaning as $R_3$ in formula (I), $R_{104}$ in formula (II) has the same meaning as $R_4$ in formula (I), and $R_{106}$ in formula (II) has the same meaning as in $R_6$ in formula (I).

Zc in formula (II) has the same meaning as Za in formula (I), and Zd in formula (II) has the same meaning as Zb in formula (I).

The dye represented by formula (II) is further preferably represented by formula (III) below.

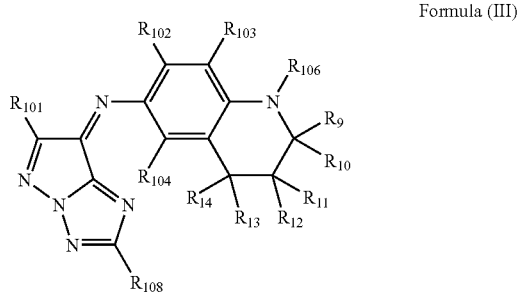

Formula (III)

In the formula, $R_9$ to $R_{14}$, $R_{101}$ to $R_{104}$, and $R_{106}$ have the same meanings as in formula (II), and $R_{108}$ represents a hydrogen atom, an alkyl group, an aryl group, or a heterocyclic group.

$R_9$ to $R_{14}$, $R_{101}$ to $R_{104}$, $R_{106}$, and $R_{108}$ in formula (III) will be described in detail below.

$R_9$ to $R_{14}$, $R_{101}$ to $R_{104}$, and $R_{106}$ in formula (III) have the same meaning as their respective counterparts in formula (II).

$R_{108}$ in formula (III) represents an alkyl group, an alkenyl group, an aryl group, or a heterocyclic group. The preferable ranges of the alkyl group, alkenyl group, aryl group, and heterocyclic group of $R_{108}$ in formula (III) are the same as the ranges of the alkyl group, alkenyl group, aryl group, and heterocyclic group described in $R_1$.

$R_{108}$ may be further substituted with any of the substituents described in $R_2$ to $R_5$. When $R_{108}$ has two or more substituents, the substituents may be the same or different.

Two or more dyes (which may be the same or different) represented by any of formulae (I) to (III) may form a bis-, tris- or polymerized compound by being linked at any one of $R_1$ to $R_{14}$ or $R_{101}$ to $R_{108}$ with each other.

The preferable range of the dye represented by formula (III) of the invention will be described below.

$R_{101}$ represents an alkyl group, an alkenyl group, an aryl group, a heterocyclic group, a hydroxy group, a cyano group, an alkoxy group, an aryloxy group, a heterocyclic oxy group, a carbamoyloxy group, an acyl group, an alkoxycarbonyl group, an aryloxycarbonyl group, a carbamoyl group, an imide group, an azo group, an alkylthio group, an arylthio group, a heterocyclic thio group, an alkylsulfinyl group, an arylsulfinyl group, an alkylsulfonyl group, an arylsulfonyl group, a sulfamoyl group, a sulfo group, a phosphonyl group and a phosphinoylamino group; $R_{102}$, $R_{103}$ and $R_{104}$ each independently represents a hydrogen atom, a halogen atom, an alkyl group, an alkenyl group, an aryl group, a heterocyclic group, an alkoxy group, an aryloxy group, an alkoxycarbonyl group, a carbamoyl group, an amino group, an anilino group, a carboamide group, a ureido group, an alkoxycarbonylamino group, a sulfonamide group, a sulfamoylamino group, an azo group, an alkylthio group, an arylthio group, a heterocyclic thio group, an alkylsulfinyl group, an arylsulfinyl group, an alkylsulfonyl group, an arylsulfonyl group, a sulfamoyl group, a sulfo group, a phosphonyl group or a phosphinoylamino group; $R_{106}$ represents an alkyl group, an alkenyl group, an aryl group or a heterocyclic group; $R_{108}$ represents a hydrogen atom, an alkyl group, an alkenyl group, an aryl group or a heterocyclic group; and $R_9$ to $R_{14}$ each independently represents a hydrogen atom, a halogen atom, an alkyl group or an alkoxy group in formula (III) of the preferable dye.

$R_{101}$ represents an alkyl group, an alkenyl group, an aryl group, a heterocyclic group, an alkoxycarbonyl group, a carbamoyl group, an imide group, an alkylthio group, an arylthio group, a heterocyclic thio group, an alkylsulfonyl group or an arylsulfonyl group; $R_{102}$, $R_{103}$ and $R_{104}$ each independently represents a hydrogen atom, a halogen atom, an alkyl group, al alkoxy group, an aryloxy group, an alkoxycarbonyl group, a carbamoyl group, a carboamide group, a ureido group, an alkoxycarbonylamino group, a sulfonamide group, an alkylthio group or an arylthio group; and $R_{106}$ represents an alkyl group, an alkenyl group, an aryl group or a heterocyclic group; $R_{108}$ represents an alkyl group, an alkenyl group, an aryl group or a heterocyclic group; and $R_9$ to $R_{14}$ each independently represents a hydrogen atom or a alkyl group in formula (III) of the more preferable dye.

$R_{101}$ represents an alkyl group, an aryl group, a heterocyclic group, an alkoxycarbonyl group, a carbamoyl group, an alkylthio group, an arylthio group, an alkylsulfonyl group or an arylsulfonyl group; $R_{102}$, $R_{103}$ and $R_{104}$ each independently represents a hydrogen atom, a halogen atom, an alkyl group, an alkoxy group, an aryloxy group, an alkoxycarbonyl group, a carbamoyl group, a carbonamide group, an ureido group, an alkoxycarbonylamino group, a sulfonamide group, an alkylthio group or an arylthio group; $R_{106}$ represents an alkyl group or aryl group; $R_{108}$ represents a hydrogen atom, an alkyl group, an alkenyl group, an aryl group or a heterocyclic group; and $R_9$ to $R_{14}$ each independently represents a hydrogen atom or an alkyl group in formula (III) of the further preferable dye.

$R_{101}$ represents an alkyl group; $R_{102}$, $R_{103}$ and $R_{104}$ each independently represent a hydrogen atom, a halogen atom, an alkyl group or an alkoxy group; $R_{106}$ represents an alkyl group; $R_{108}$ represents an alkyl group, an alkenyl group, an aryl group or a heterocyclic group; and $R_9$ to $R_{14}$ each independently represents a hydrogen atom or an alkyl group in formula (III) of the further preferable dye.

$R_{101}$ represents a tert-alkyl group (the tert-alkyl group with a preferable carbon number of 4 to 16 and more preferable carbon number of 4 to 8 such as t-butyl, t-amyl, t-octyl, t-adamantyl or ethylcyclohexyl group); $R_{102}$, $R_{103}$ and $R_{104}$ each independently represents a hydrogen atom, a halogen atom (for example a fluorine, chlorine, bromine, iodine atom, more preferably the fluorine or chlorine atom), an alkyl group (the alkyl group with a preferable carbon number of 1 to 12 and more preferable carbon number of 1 to 8 such as a methyl, ethyl, propyl, isopropyl, t-butyl, cyclohexyl or 2-ethylhexyl group) or an alkoxy group (the alkoxy group with a preferable carbon number of 1 to 12 and more preferable carbon number of 1 to 8 such as a methoxy, ethoxy, isopropyloxy, octyloxy or 2-ethylhexyloxy group); $R_{106}$ represents an alkyl group (the alkyl group with preferable carbon number of 1 to 18 and more preferable carbon number of 1 to 12 such as a methyl, ethyl, propyl, isopropyl, octyl, 2-ethylhexyl, 2-hydroxyethyl or 3-hydroxypropyl group), $R_{108}$ represents an alkyl group (with a preferable carbon number of 1 to 24 and more preferable carbon number of 1 to 18 such as a methyl, ethyl, isopropyl, t-butyl, 2-ethylhexyl, dodecyl or hexadecyl group), an alkenyl group (the alkenyl group with a preferable carbon number of 2 to 18 and more preferable carbon number of 2 to 12 such as a vinyl, aryl or 3-butene-1-yl group), an aryl group (the aryl group with a preferable carbon number of 6 to 24 and more preferable carbon number of 6 to 12 such as a phenyl or naphthyl group), or a heterocyclic group (the heterocyclic group with a preferable carbon number of 1 to 12 and more preferable carbon number of 2 to 12 such as a 2-thienyl, 4-pyridyl, 2-pyridyl, 2-imidazolyl or 3-pyrazolyl group); $R_9$ and $R_{10}$ represent alkyl groups (the alkyl group with a preferable carbon number of 1 to 8 and more preferable carbon number of 1 to 4 such as methyl, ethyl or propyl group, most preferably the methyl group), $R_{11}$ to $R_{13}$ represent hydrogen atoms; and $R_{14}$ represents an alkyl group (the alkyl group with a preferable carbon number of 1 to 8 and more preferable carbon number of 1 to 4 such as methyl, ethyl or propyl group, most preferably the methyl group) in formula (III) of the most preferable dye.

While specific examples of the dye represented by formulae (I) to (III) are shown below, the invention is by no means restricted to these examples.

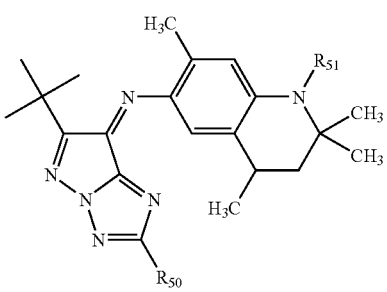

| No. of exemplified dye | $R_{50}$ | $R_{51}$ |
|---|---|---|
| M-1 | 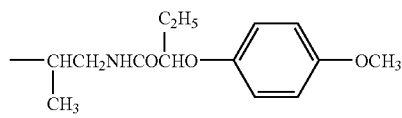 | —$CH_2CH_2CH_2OH$ |
| M-2 | 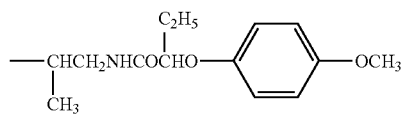 | —$CH_2CH_2OH$ |
| M-3 | 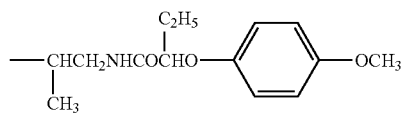 | —$CH_2COOC_2H_5$ |
| M-4 | 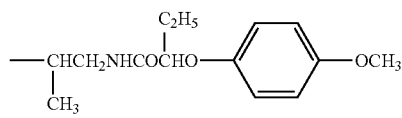 | —$CH_2CH_2CH_2COOH$ |
| M-5 | 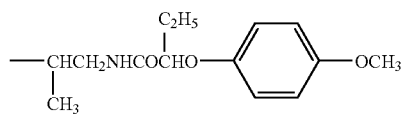 | —$C_3H_7(iso)$ |

-continued
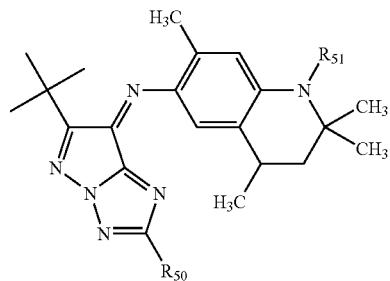
| | | |
|---|---|---|
| M-6 | 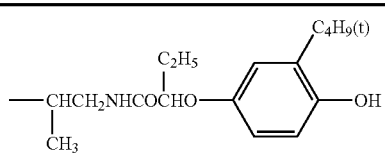 | —CH₂CH(C₂H₅)C₄H₉ |
| M-7 | 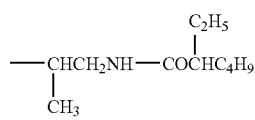 | —CH₂CH₂NHSO₂CH₃ |
| M-8 | 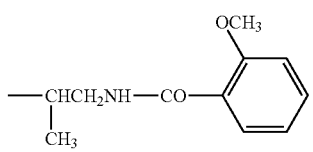 | —CH₂CH₂CH₂COOH |
| M-9 | 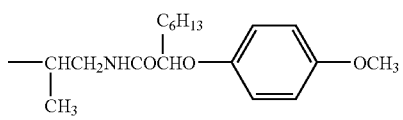 | —CH₂CH₂CH₂OH |
| M-10 | 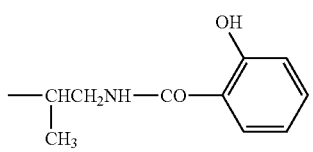 | " |
| M-11 | 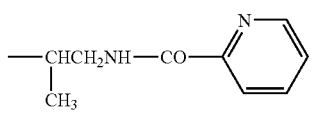 | " |
| M-12 | 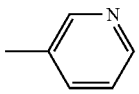 | " |
| M-13 | 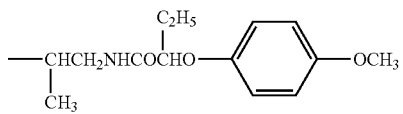 | 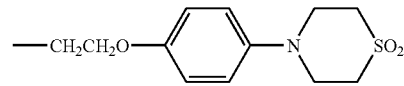 |
| M-14 | 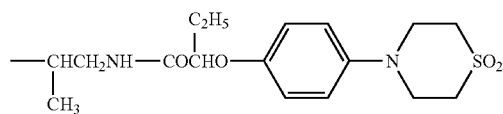 | 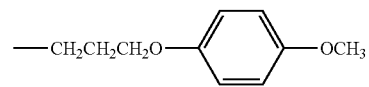 |
| M-15 |  | —CH₂CH(C₂H₅)C₄H₉ |

-continued
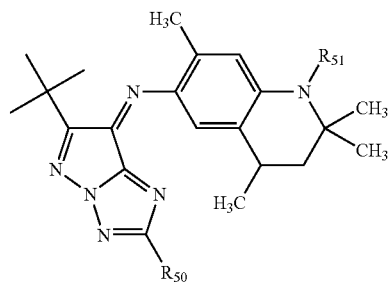
| | | |
|---|---|---|
| M-16 | 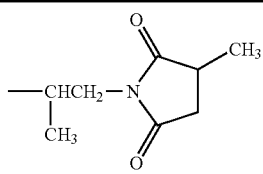 | " |
| M-17 | 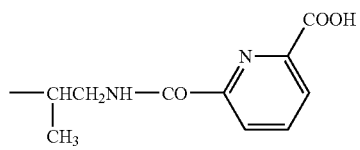 | —C$_8$H$_{17}$ |
| M-18 | 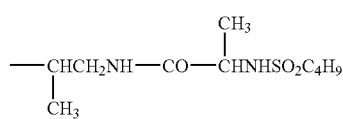 | " |
| M-19 | 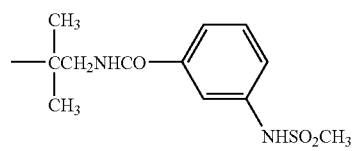 | —CH$_2$CH$_2$OH |
| M-20 | 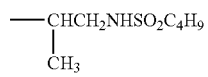 | " |
| M-21 | 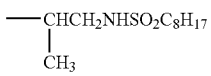 | " |
| M-22 | 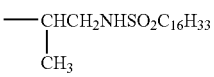 | —C$_2$H$_5$ |
| M-23 | 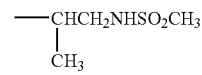 | 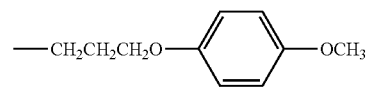 |
| M-24 | 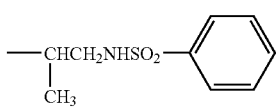 | 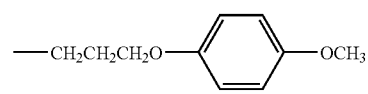 |
| M-25 | 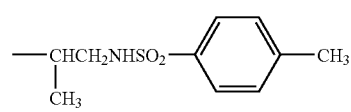 | —CH$_2$CH$_2$OH |
| M-26 | 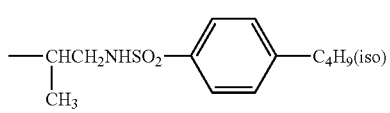 | " |

-continued
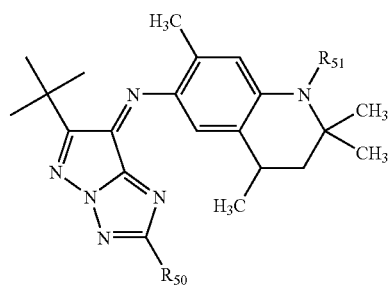
| | | |
|---|---|---|
| M-27 | 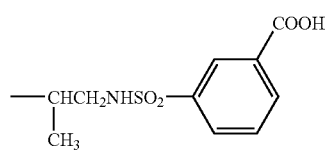 | —C$_8$H$_{17}$ |
| M-28 | 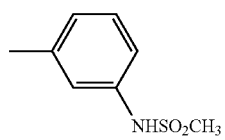 | —CH$_2$CH(C$_2$H$_5$)C$_4$H$_9$ |
| M-29 | 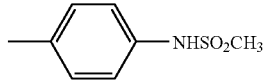 | " |
| M-30 | 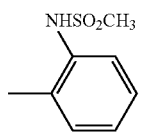 | —C$_{12}$H$_{25}$ |
| M-31 | 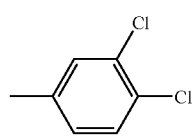 | " |
| M-32 | 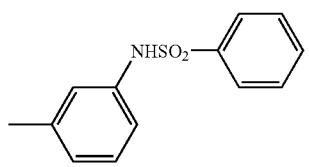 | —CH$_2$CH$_2$OH |
| M-33 | 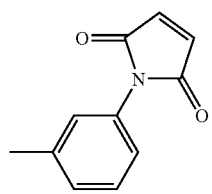 | " |
| M-34 | 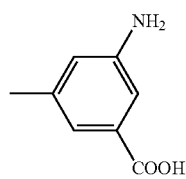 | —CH$_2$CH(C$_2$H$_5$)C$_4$H$_9$ |

-continued
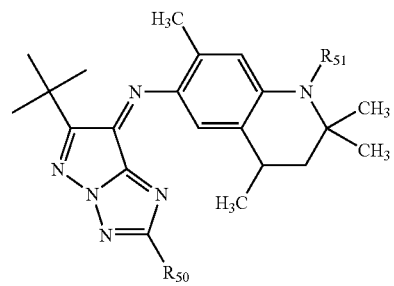
| | | |
|---|---|---|
| M-35 | 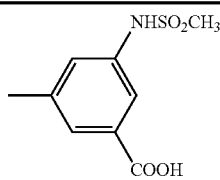 | 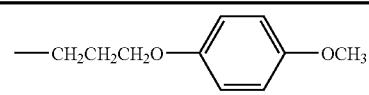 |
| M-36 | 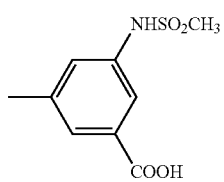 | 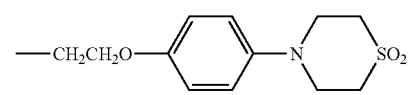 |
| M-37 | 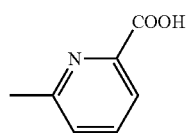 | 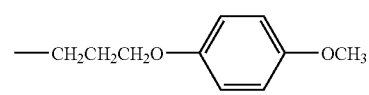 |
| M-38 | —CF$_3$ | 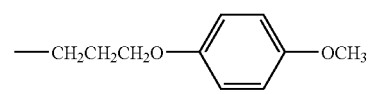 |
| M-39 | —C$_7$F$_{15}$ | 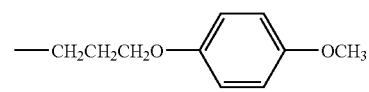 |
| M-40 | —CHCH$_2$NHSO$_2$C$_8$H$_{17}$<br>    \|<br>   CH$_3$ | —CH$_2$CH$_2$SO$_2$CH$_3$ |
| M-41 | —CHCH$_2$NHSO$_2$C$_8$H$_{17}$<br>    \|<br>   CH$_3$ | —CH$_2$CH$_2$SC$_4$H$_9$ |
| M-42 | —CHCH$_2$NHSO$_2$C$_8$H$_{17}$<br>    \|<br>   CH$_3$ | —CH$_2$CH$_2$OCH$_2$CH$_2$OCH$_3$ |
M-43
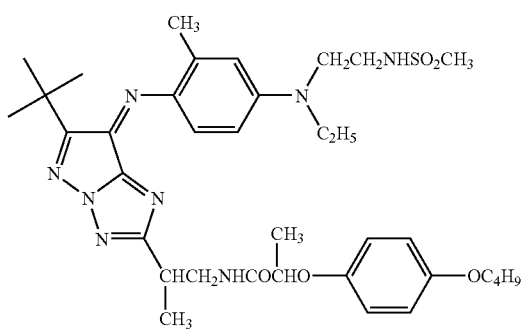
M-44
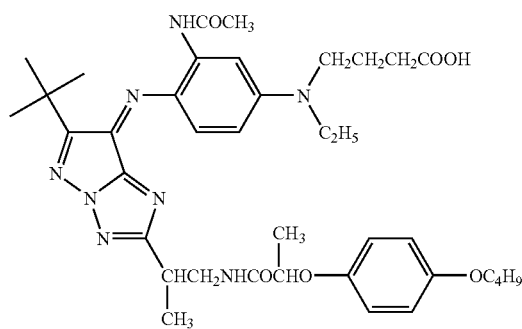

-continued
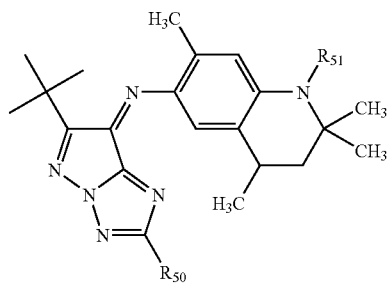
M-45
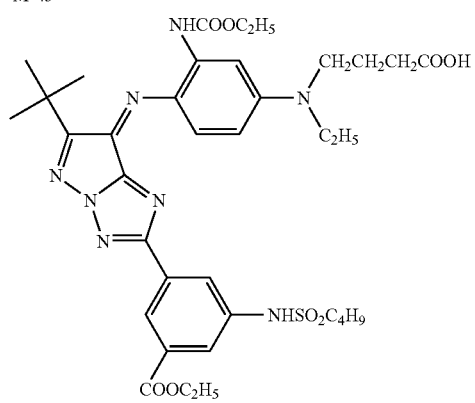
M-46
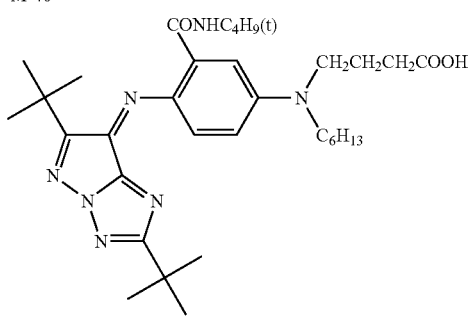
M-47
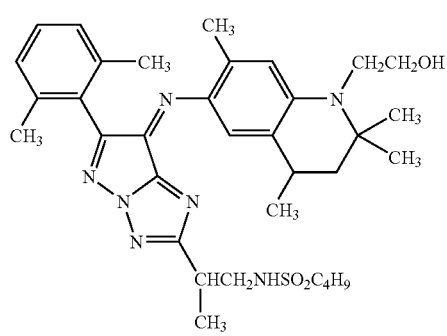
M-48
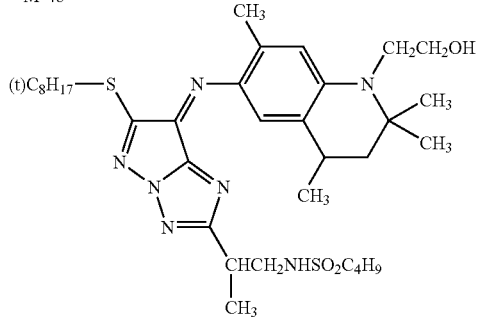
M-49
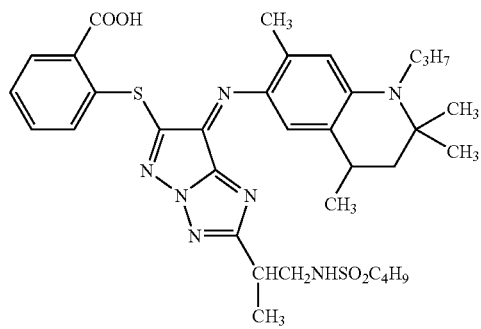
M-50
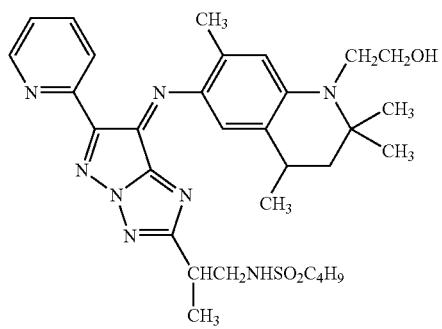

-continued
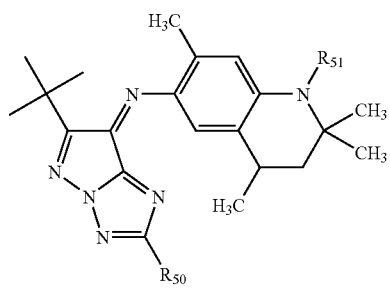
M-51
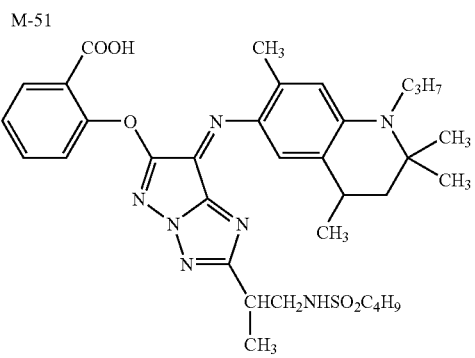
M-52
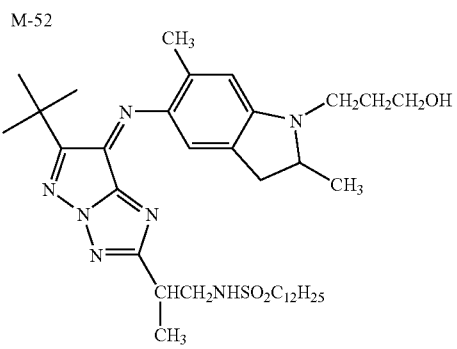
M-53
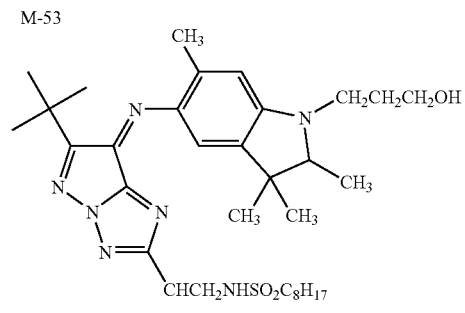
M-54
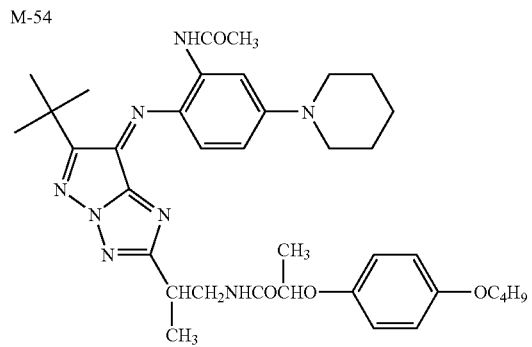
M-55
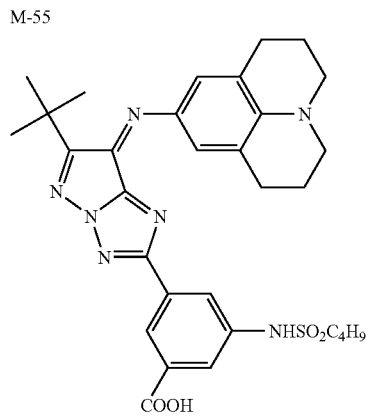
M-56
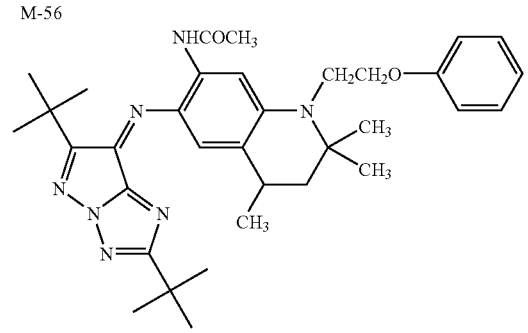

-continued
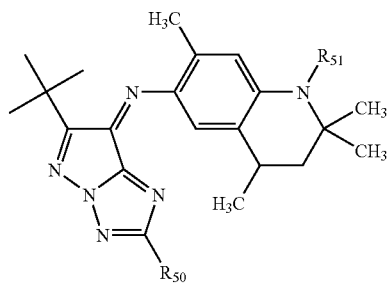
M-57
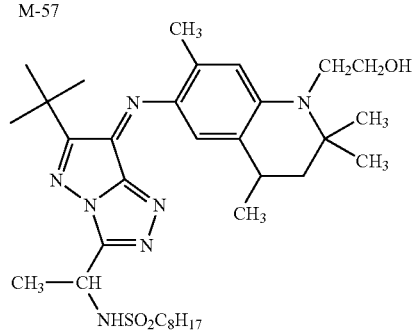
M-58
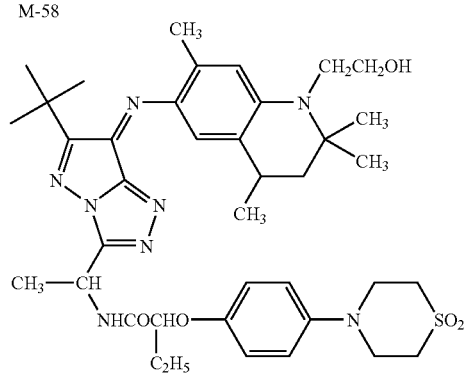
M-59
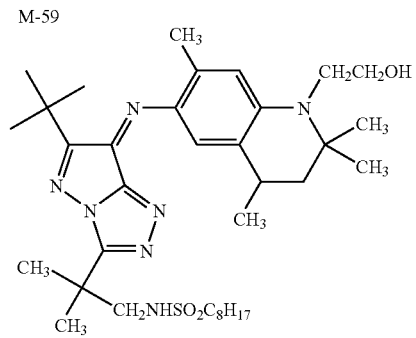
M-60
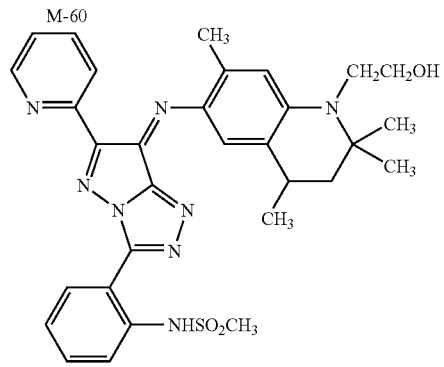
M-61
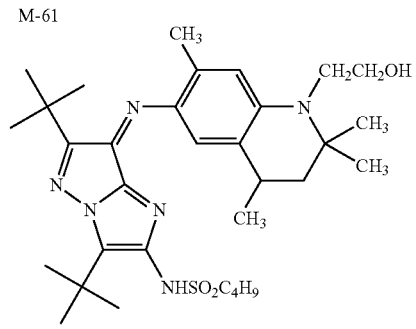
M-62
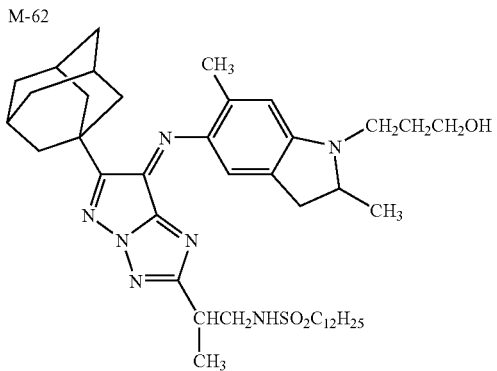

-continued
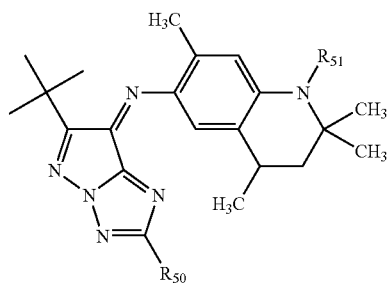
M-63
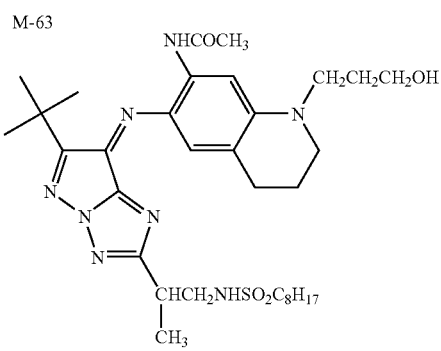
M-64
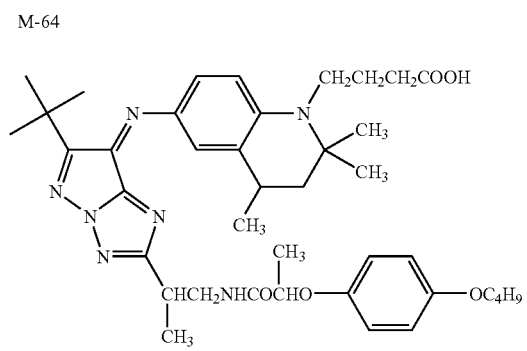
M-65
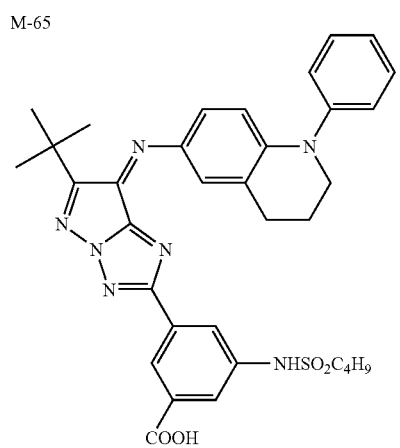
M-66
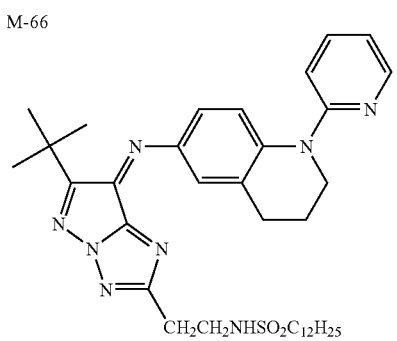
M-67
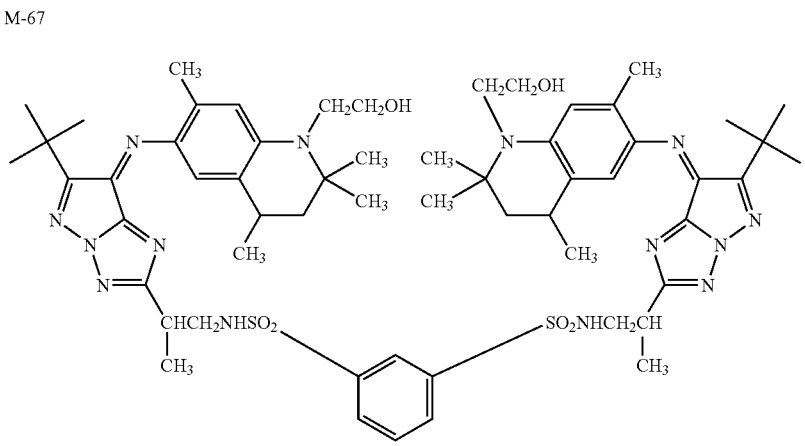

-continued
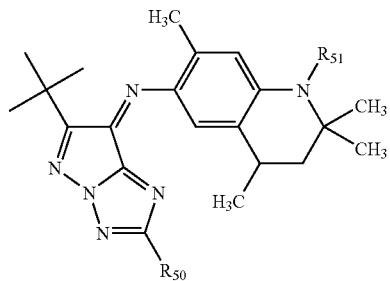
M-68
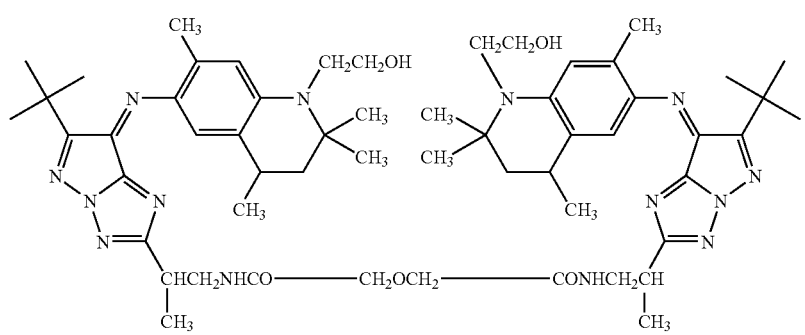
M-69
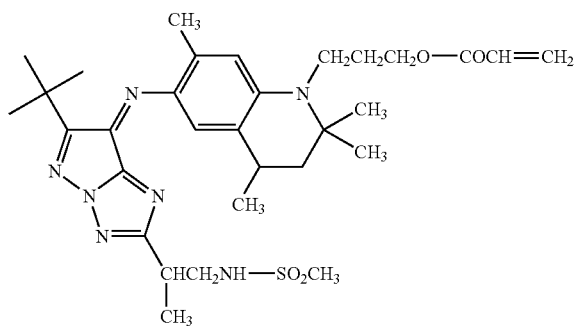
M-70
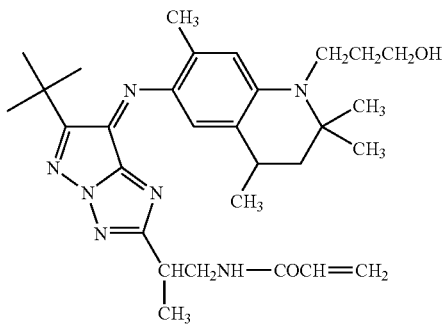

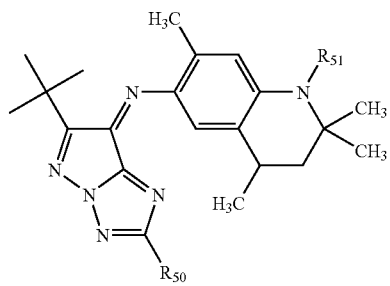
M-71
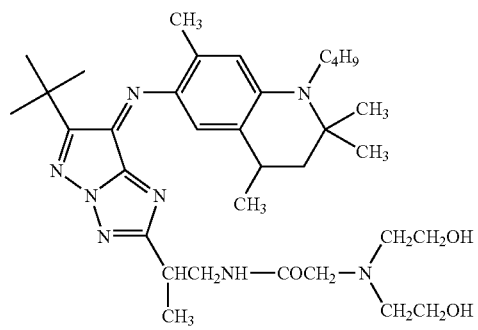
M-72
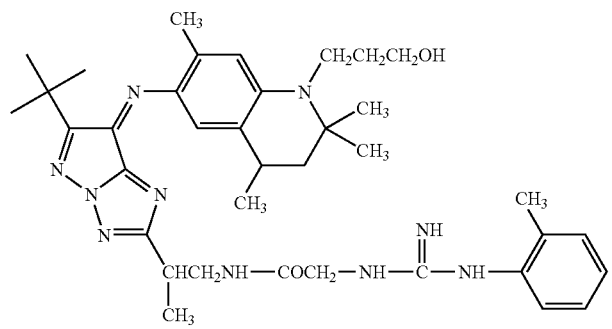
M-73
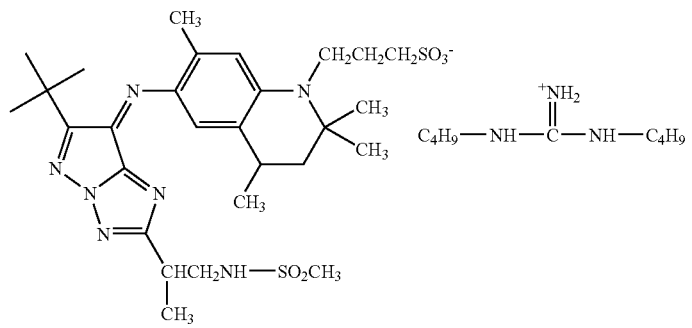

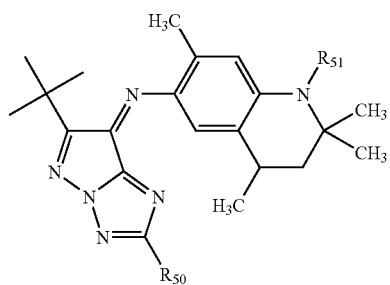
M-74
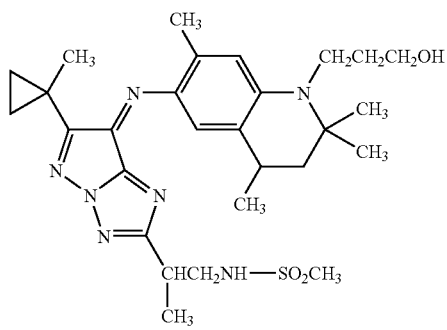
M-75
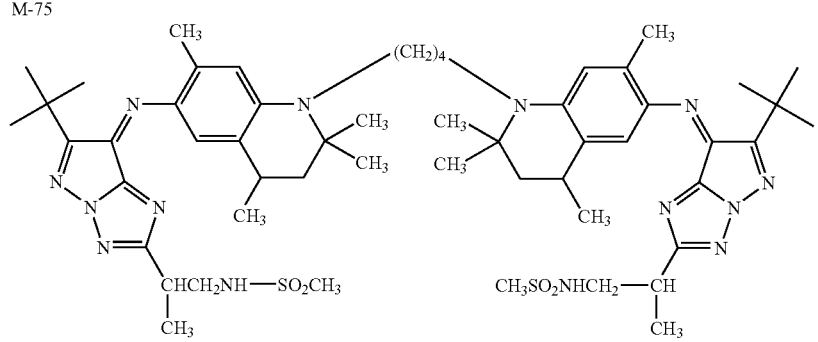
M-76
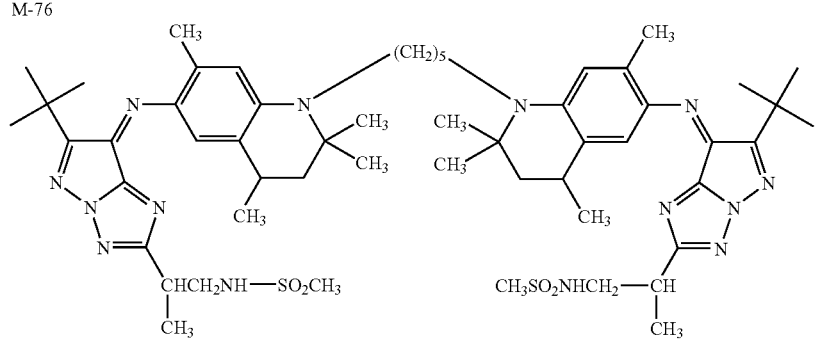

-continued
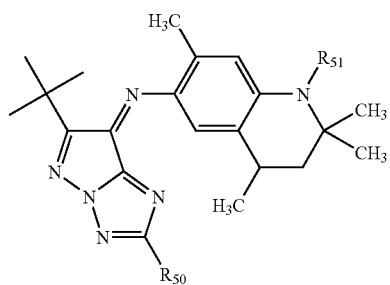
M-77
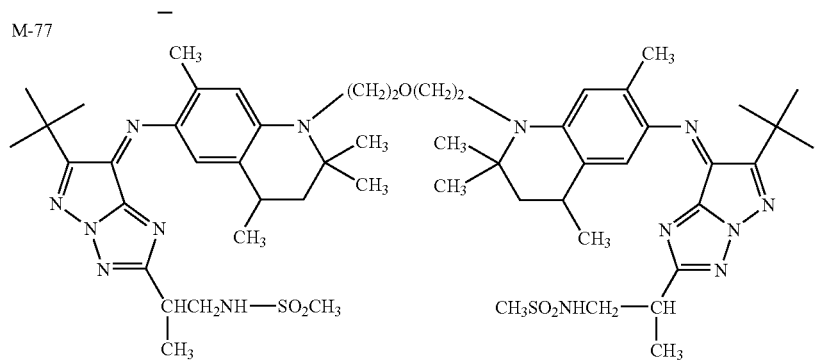
M-78
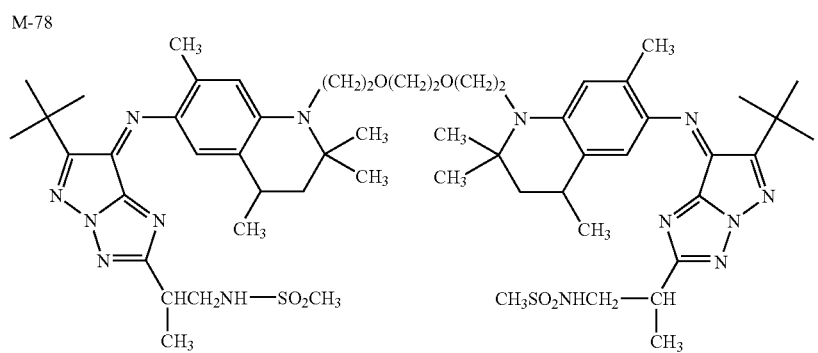
M-79
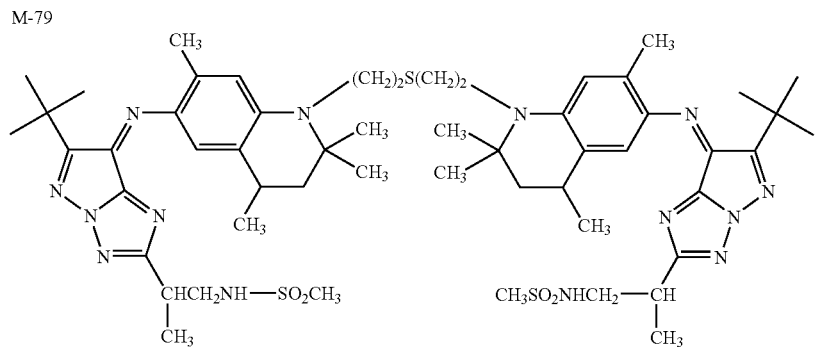

-continued
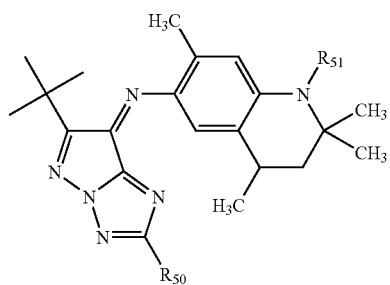
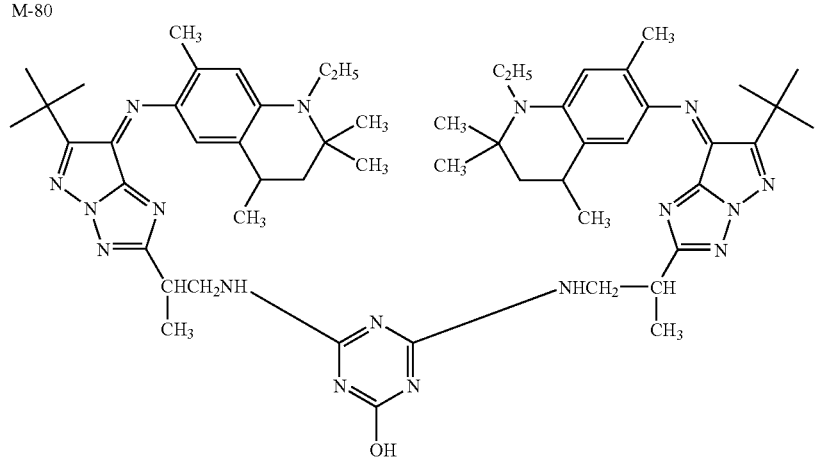
M-80
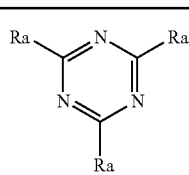
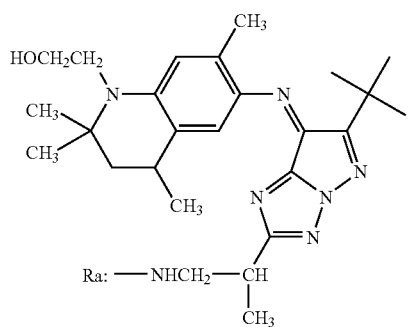
M-81
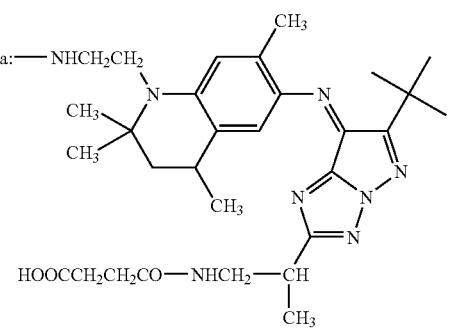
M-82

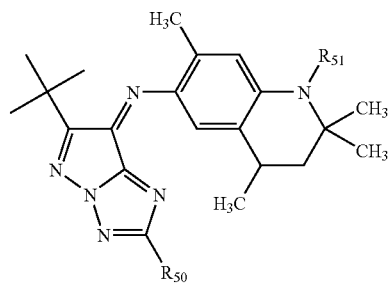
M-83
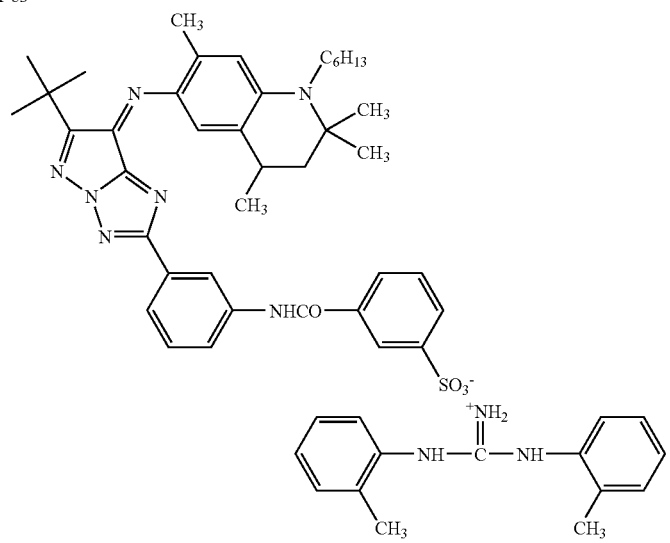
M-84
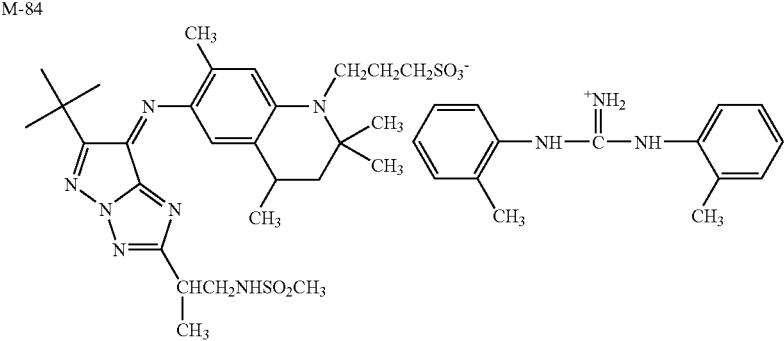

While an example of synthesis of dye M-1 in formula (I) of the invention is shown by the following reaction scheme A, the invention is by no means restricted to the example.

SYNTHESIS EXAMPLE

Synthesis of Dye M-1

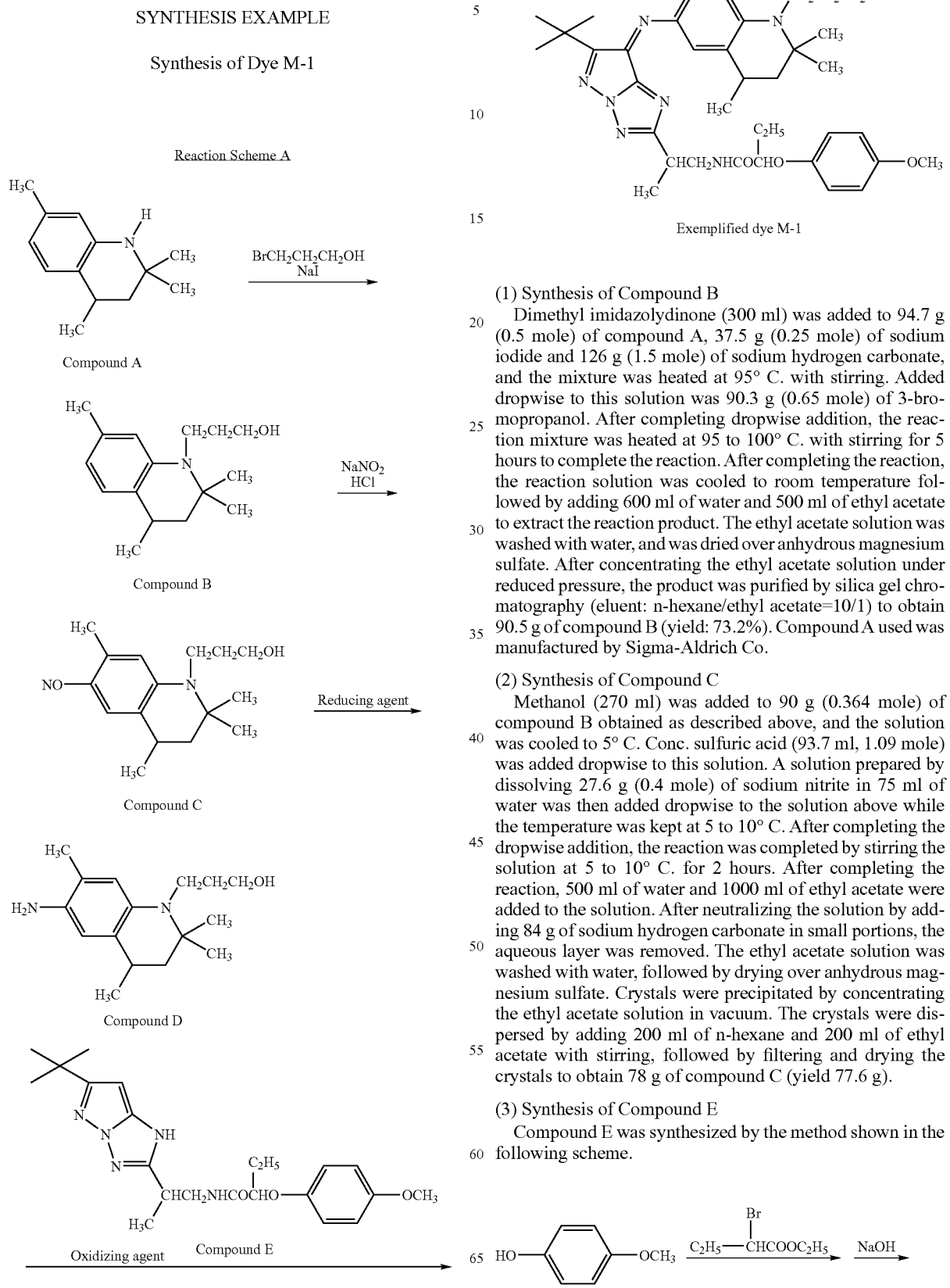

Exemplified dye M-1

(1) Synthesis of Compound B

Dimethyl imidazolydinone (300 ml) was added to 94.7 g (0.5 mole) of compound A, 37.5 g (0.25 mole) of sodium iodide and 126 g (1.5 mole) of sodium hydrogen carbonate, and the mixture was heated at 95° C. with stirring. Added dropwise to this solution was 90.3 g (0.65 mole) of 3-bromopropanol. After completing dropwise addition, the reaction mixture was heated at 95 to 100° C. with stirring for 5 hours to complete the reaction. After completing the reaction, the reaction solution was cooled to room temperature followed by adding 600 ml of water and 500 ml of ethyl acetate to extract the reaction product. The ethyl acetate solution was washed with water, and was dried over anhydrous magnesium sulfate. After concentrating the ethyl acetate solution under reduced pressure, the product was purified by silica gel chromatography (eluent: n-hexane/ethyl acetate=10/1) to obtain 90.5 g of compound B (yield: 73.2%). Compound A used was manufactured by Sigma-Aldrich Co.

(2) Synthesis of Compound C

Methanol (270 ml) was added to 90 g (0.364 mole) of compound B obtained as described above, and the solution was cooled to 5° C. Conc. sulfuric acid (93.7 ml, 1.09 mole) was added dropwise to this solution. A solution prepared by dissolving 27.6 g (0.4 mole) of sodium nitrite in 75 ml of water was then added dropwise to the solution above while the temperature was kept at 5 to 10° C. After completing the dropwise addition, the reaction was completed by stirring the solution at 5 to 10° C. for 2 hours. After completing the reaction, 500 ml of water and 1000 ml of ethyl acetate were added to the solution. After neutralizing the solution by adding 84 g of sodium hydrogen carbonate in small portions, the aqueous layer was removed. The ethyl acetate solution was washed with water, followed by drying over anhydrous magnesium sulfate. Crystals were precipitated by concentrating the ethyl acetate solution in vacuum. The crystals were dispersed by adding 200 ml of n-hexane and 200 ml of ethyl acetate with stirring, followed by filtering and drying the crystals to obtain 78 g of compound C (yield 77.6 g).

(3) Synthesis of Compound E

Compound E was synthesized by the method shown in the following scheme.

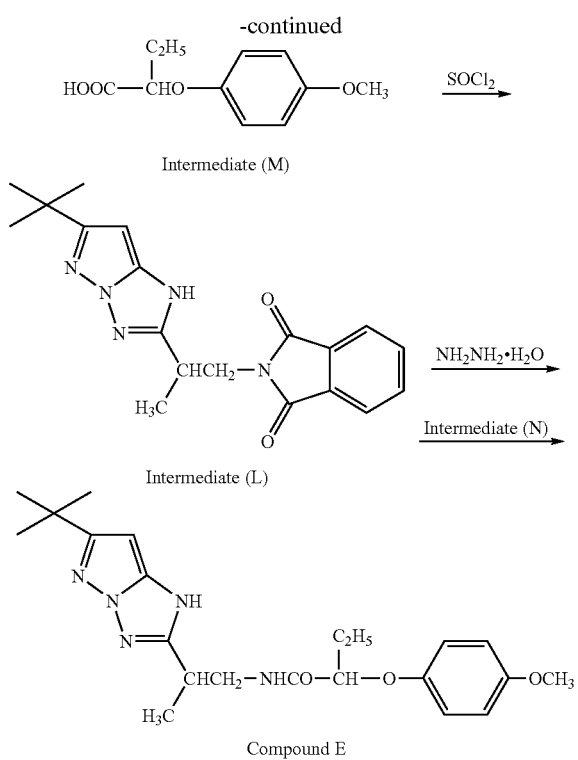

-Synthesis of Intermediate (M)-

Dimethylacetamide (600 ml) was added to 112 g (0.9 mole) of 4-methoxyphenol, and 196 ml of 28% methanol solution of sodium methoxide was added to the solution. After completing the addition, 190 g (0.974 mole) of ethyl 2-bromobutanate was added dropwise to the solution above. After completing the dropwise addition, the reaction was completed by stirring the reaction solution for 3 hours at room temperature.

Water (1000 ml) and ethyl acetate (1000 ml) were added to the reaction solution, and the reaction product was extracted with ethyl acetate. After washing the ethyl acetate solution with saline, ethyl acetate was evaporated off from the ethyl acetate solution. Methanol (250 ml) was added to the residue, and the solution was stirred at room temperature. An aqueous solution prepared by dissolving 144 g of sodium hydroxide in 1000 ml of water was added to the methanol solution above. The solution was heated at 50 to 55° C. and stirred for 2 hours. After completing the reaction, 340 ml of conc. hydrochloric acid was added dropwise to this reaction solution to acidify the solution, followed by extracting the reaction product by adding 1000 ml of ethyl acetate. This ethyl acetate solution was washed with saline, and dried over anhydrous sodium sulfate. The ethyl acetate solution was concentrated under reduced pressure to obtain the intermediate in a quantitative yield.

-Synthesis of Intermediate (N)-

Toluene (400 ml) was added to 93.1 g (0.433 mole) of the intermediate (M) obtained by the method above, and the solution was heated at 85 to 90° C. with stirring. Thionyl chloride (50 ml) was added dropwise to this solution and heated with stirring for 3 hours. After completing the reaction, toluene and excess thionyl chloride were evaporated off under reduced pressure. Then, 100 ml of ethyl acetate was added to the residue after cooling it to room temperature, to obtain 100 ml of ethyl acetate in order to use the solution in the next step.

-Synthesis of Compound E-

Intermediate L was synthesized by the method according to JP-A No. 2-201443, the disclosure of which is incorporated by reference herein, wherein 5-amino-3-methylpyrazole as a starting material was changed to 5-amino-3-tert-butylpyrazole (synthesized according to the method in Japanese Patent Publication No. 2670943, the disclosure of which is incorporated by reference herein).

Added to this intermediate L (189 g, 0.538 mole) was 570 ml of 2-propanol, and the solution was heated with stirring. Hydrazine monohydrate (33.6 g, 0.673 mole) was added to this solution, and the mixture was heated for 2 hours with stirring. After completing the reaction, about 400 ml of 2-propanol was evaporated of under reduced pressure. Sodium hydrogen carbonate (420 g), water (1500 ml) and ethyl acetate (1200 ml) were added to the residue, and the solution was stirred at room temperature.

An ethyl acetate solution of intermediate (N) obtained by the method above was added dropwise to this solution. After completing the dropwise addition, the mixture was stirred at room temperature for 2 hours, followed by removing the aqueous layer. Crystals were precipitated by washing this ethyl acetate solution with water. After adding 1200 ml of n-hexane to this dispersion solution with stirring for 1 hour, the crystals were filtered, washed with water and dried to obtain 159 g of compound E (yield: 86.9%).

(4) Synthesis of Exemplified dye M-1

Methanol (50 ml), ethyl acetate (100 ml) and water (100 ml) were added to compound C (7.35 g, 0.0266 mole) obtained by the method above, and the mixture was heated at 40° C. with stirring. Sodium hydrosulfite (25 g) was added to this solution in small portions. After completing the addition, the mixture was allowed to react for 1 hour at 40° C. After completing the reaction, the solution was cooled to room temperature, and ethyl acetate (100 ml) and water (200 ml) were added followed by removing ethyl acetate. This ethyl acetate solution was used in the next step.

Methanol (100 ml) and water (200 ml) were added to compound E (10.0 g, 0.0242 mole) and sodium hydrogen carbonate (21 g), and the mixture was stirred at room temperature. All the ethyl acetate solution above was added to this solution. An aqueous solution prepared by dissolving 12 g of ammonium persulfate in 100 ml of water was added dropwise to this solution. The reaction was continued at room temperature for 1 hour after completing the addition. After completing the reaction, the aqueous layer was removed, and the remaining ethyl acetate solution was washed with water. This ethyl acetate solution was concentrated under reduced pressure. The residue was purified by silica gel column chromatography (elution solvent: n-hexane/ethyl acetate=1/1) to obtain amorphous dye M-1. This dye had λmax of 556 nm and molar absorbance of 55,000 (ethyl acetate solution).

The compounds represented by the formulae (I) to (III) may be used, alone or in combination, as the dye for use in the colored curable composition of the invention.

The concentration of the dye in the colored curable composition of the invention is preferably 0.5 to 80% by mass, more preferably 0.5 to 60% by mass, and particularly preferably 0.5 to 50% by mass relative to the total solid content in the composition, although the concentration depends on the molecular weight and molar absorbance of the dye.

-Binder-

The colored curable composition of the invention preferably comprises at least one binder. While the binder according to the invention is not particularly restricted so long as it is soluble in an alkali solution, it is preferably selected considering heat resistance, developablity and availability.

The alkali-soluble binder is preferably a linear organic polymer, which is soluble in organic solvents and developable with an aqueous weak alkali solution. Examples of such linear organic polymer include polymers having a carboxylic acid at their side chain, for example methacrylic acid copolymers, acrylic acid copolymers, itaconic acid copolymers, crotonic acid copolymers, maleic acid copolymers and partially esterified maleic acid copolymers as described in the specifications of JP-A Nos. 59-44615, 59-53836 and 59-71048, and JP-B Nos. 54-34327, 58-12577 and 54-25957. Acidic cellulose derivatives having a carboxylic acid at the side chain are particularly useful. Other useful binders include polymers prepared by adding an acid anhydride to a polymer having a hydroxyl group, polyhydroxystyrene resins, polysiloxane resins, poly(2-hydroxyethyl(meth)acrylate), polyvinyl pyrrolidone, polyethylene oxide and polyvinyl alcohol.

The binder resin may be prepared by copolymerization of monomers having a hydrophilic group. Examples of such monomer include akoxyalkyl(meth)acrylate, hydroxyalkyl (meth)acrylate, glycerol(meth)acrylate, (meth)acrylamide, N-methylol acrylamide, sec- and tert-alkyl acrylamide, dialkylaminoalkyl(meth)acrylate, morpholino(meth)acrylate, N-vinyl pyrrolidone, N-vinyl caprolactam, vinyl imidazole, vinyl triazole, methyl(meth)acrylate, ethyl(meth)acrylate, branched or linear propyl(meth)acrylate, branched or linear butyl(meth)acrylate, and phenoxyhydroxypropyl (meth)acrylate.

Other useful monomers having a hydrophilic group include monomers having tetrahydrofurfuryl group, phosphate, phosphate ester group, quaternary ammonium salt, ethyleneoxy chain, propyleneoxy chain, sulfonic acid and salts thereof, morpholinoethyl group or the like.

The binder may have a polymerizable groups at its side chain for improving cross-link efficiency. Polymers containing allyl groups, (meth)acrylic groups, allyloxyalkyl groups or the like at their side chain are useful. Examples of the polymer having such polymerizable group include KS resist 106 (trade name, manufactured by Osaka Organic Chemical Industries, Ltd.) and Cyclomer-P Series (trade name, manufactured by Daicel Chemical Industries, Ltd.).

Alcohol-soluble nylons and polyethers of 2,2-bis(4-hydroxyphenyl)propane and epichlorohydrin are also useful for enhancing the strength of cured coating films.

Among these binders, from the view point of heat resistance, polyhydroxystyrene resins, polysiloxane resins, acrylic resins, acrylamide resins and acrylic/acrylamide copolymer resins are preferable, and from the viewpoint of controlling developability, acrylic reins, acrylamide resins and acrylic/acrylamide copolymer resins are preferable. Preferable acrylic resins include copolymers comprising the monomers selected from benzyl(meth)acrylate, (meth)acrylate, hydroxyethyl(meth)acrylate, (meth)acrylamide or the like, KS-resist 106 (trade name, manufactured by Osaka Organic Chemical Industries, Ltd.) and Cyclomer-P Series (trade name, manufactured by Daicel Chemical Industries Co.).

Alkali-soluble phenol resins may be used as the binder employed in the invention. When the colored curable composition of the invention is a positive-type composition, the alkali-soluble phenol resin can be favorably used therein. Examples of the alkali-soluble phenol resin include a novolac resin and vinyl polymers.

The novolac resin can be obtained, for example, by condensation of a phenol and an aldehyde in the presence of an acid catalyst. Examples of the phenol include phenol, cresol, ethylphenol, butylphenol, xylenol, phenylphenol, catechol, resorcinol, pyrogallol, naphthol and bisphenol A.

Examples of the aldehyde include formaldehyde, paraformaldehyde, acetaldehyde, propionaldehyde and benzaldehyde.

One or more of the phenol compounds and one or more of the aldehyde compounds may be used in combinatios.

Specific examples of the novolac resin include methacresol and paracresol, and a condensation product of the mixture of methacresol and paracresol and formalin.

The molecular weight distribution of the novolac resin may be adjusted by a method such as fractionation. Otherwise, low molecular weight components having a phenolic hydroxyl group such as bisphenol C and bisphenol A may be added to the novolac resin.

The mass average molecular weight (as converted into polystyrene measured by GPC) of the binder is preferably 1000 to $2\times10^5$, more preferably 2000 to $1\times10^5$, and particularly 5000 to $5\times10^4$.

The amount of use of the binder in the colored curable composition of the invention is preferably 10 to 90% by mass, more preferably 20 to 80% by mass, and particularly preferably 30 to 70% by mass, relative to the total solid content in the composition.

-Cross-linking Agent-

While the curing reaction of the film may be more improved than usual by using the dye represented by the formulae (I) to (III) to enable a film having good curability to be obtained, more highly cured films may be obtained using an auxiliary cross-linking agent.

While the cross-linking agents which can be used in the invention is not particularly restricted so long as they are able to cure the film by a cross-linking reaction, examples of the cross-linking agent include (a) an epoxy resin, (b) a melamine compound, guanamine compound, glycoluryl compound or urea compound substituted by at least one substituent selected from a methylol group, alkoxymethyl group and acyloxymetyl group, and (c) a phenol compound, naphthol compound or hydroxyanthracene compound substituted by at least one substituent selected from a methylol group, alkoxymethyl group and acyloxymethyl group. Polyfunctional epoxy resins are particularly preferable among them.

While any resins may be used as the epoxy resin of component (a) so long as they contain epoxy groups and are able to form cross-links, examples of these compound include bisphenol A-glycidyl ether; ethyleneglycol glycidyl ether; ethyleneglycol diglycidyl ether; butanediol diglycidyl ether; hexanediol diglycidyl ether; dihydroxyphenyl glycidyl ether; phthalic acid diglycidyl ester; divalent glycidyl group-containing low molecular weight compounds such as N,N-glycidylaniline; trivalent glycidyl group-containing low molecular weight compound represented by trimethylolpropane triglycidyl ether, trimethylolphenol triglycidyl ether and Tris P-PA triglycidyl ether; tetravalent glycidyl group-containing low molecular weight compounds represented by pentaerythritol tetraglycidyl ether; polyvalent glycidyl group-containing low molecular weight compounds such as dipentaerythritol pentaglycidyl ether and dipentaerythritol hexaglycidyl ether; glycidyl group-containing polymer compounds represented by polyglycidyl(meth)acrylate, 1,2-epoxy-4-(2-oxysilanyl)cyclohexane adduct of 2,2-bis(hydroxymethyl)-1-butanol.

While the number of the substituents, i.e. methylol group, alkoxymethyl group or acyloxymethyl group contained in component (b) is 2 to 6 in the melamine compound, and 2 to 4 in the glycoluryl compound, guanamine compound and urea compound, the preferable number is 5 to 6 in the melamine compound, and 3 to 4 in the glycoluryl compound, guanamine compound and urea compound.

These methylol group-containing compounds can be obtained by heating the alkoxymethyl group-containing compound in an alcohol in the presence of an acid catalyst such as hydrochloric acid, sulfuric acid and methanesulfonic acid. The acyloxymethyl group-containing compound can be obtained by mixing the methylol group-containing compound with an acyl chloride with stirring in the presence of a basic catalyst.

Specific examples of compound (b) having the substituents above include the following.

Examples of the melamine compound include hexamethylol melamine, hexamethoxymethyl melamine, compounds in which 1 to 5 methylol groups of hexamethylol melamine are methoxymethylated or mixtures thereof, hexamethoxyethyl melamine, hexaacyloxymethyl melamine and compounds in which 1 to 5 methylol groups of hexamethylol melamine are acyloxymethylated or mixtures thereof.

Examples of the guanamine compound include tetramethylol guanamine, tetramethoxymethyl guanamine, compounds in which 1 to 3 methylol groups of tetramethylol guanamine are methoxymethylated or mixtures thereof, tetramethoxyethyl guanamine, tetraacyloxymethyl guanamine and compounds in which 1 to 3 methylol groups of tetramethylol guanamine are acyloxymethylated or mixtures thereof.

Examples of the glycoluryl compound include tetramethylol glycoluryl, tetramethoxymethyl glycoluryl, compounds in which 1 to 3 methylol groups of tetramethylol glycoluryl are methoxymethylated or mixtures thereof, and compounds in which 1 to 3 methylol groups of tetramethylol glycoluryl group is acyloxymethylated or mixtures thereof.

Examples of the urea compound include tetramethylol urea, tetramthoxymetyl urea, compounds in which 1 to 3 methylol groups of tetramethylol urea are methoxymethylated or mixtures thereof, and tetramethoxyethyl urea.

The compounds (b) may be used alone, or as a combination thereof.

The phenol compound, naphthol compound or hydroxyantharacene compound substituted by at least one group selected from a methylol group, an alkoxymethyl group and an acyloxymetyl group contained as component (c) suppresses intermixing of the topcoat photoresist by thermal cross-linking and further enhances the strength of the film as the case of compound (b).

The number of the substituent selected from a methylol group, acyloxymethyl group or alkoxymethyl group contained in component (c) is at least two per one molecule. The compound is preferably a phenolic compound substituted at 2- and 4-positions from the viewpoint of heat cross-linking ability and storability. It is also preferable that the naphthol compound and hydroxyanthracene compound as the frame are substituted at the ortho- and para-positions relative to the OH group.

The 3- and 5-positions of the phenol compound as the frame may be unsubstituted, or may be substituted. In the naphthol compounds as the frame, other position than the ortho of the OH group may be unsubstituted, or may be substituted.

The methylol group-containing compound can be obtained using a compound having a hydrogen atom at the ortho- or para-position of the phenolic OH group, and by allowing the compound to react with formalin in the presence of a basic catalyst such as sodium hydroxide, potassium hydroxide, ammonia or hydroxyl tetraalkylammonium. The alkoxymethyl group-containing compound can be obtained by heating the methylol group-containing compound in an alcohol in the presence of an acid catalyst such as hydrochloric acid, sulfuric acid and methanesulfonic acid. The acyloxymethyl group-containing compound can be obtained by allowing the methylol group-containing compound to react with an acyl chloride in the presence of a basic catalyst.

Examples of the frame compound in component (C) include unsubstituted phenol compounds at the ortho-or para-position of the phenolic OH group, naphthol compounds; hydroxyanthracene compounds such as isomers of phenol and cresol; 2,3-xylenol, 2,5-xylenol, 3,4-xylenol and 3,5-xylenol; bisphenols such as bisphenol A; 4,4'-bishydroxybiphenyl; Tris P-PA (manufactured by Honshu Chemical Industry Co.); naphthol; dihydroxynaphthalene; and 2,7-dihydroxyanthracene.

Specific examples of component (c) include trimethylolphenol, tri(trimethoxymethyl)phenol, compounds in which 1 to 2 methylol groups of trimethylolphenol are methoxymethylated, trimethylol-3-cresol, tri(methoxymethyl)-3-cresol, compounds in which 1 to 2 methylol groups of trimethylol-3-cresol are methoxymethylated, dimethylol cresol such as 2,6-dimethylol-4-cresol, tetramethylol bisphenol A, tetramethoxymethyl bisphenol A, compounds in which 1 to 3 methylol groups of tetramethylol bisphenol A are mehtoxymethylated; tetramethylol-4,4'-bishydroxybiphenyl, tetramethoxymethyl-4,4'-bishydroxybiphenyl, hexamethylol derivatives of Tris P-PA, hexamthoxymethyl derivatives of Tris P-PA, compound in which 1 to 5 methylol groups of hexamethylol derivatives of Tris-P are methoxymethylated, and bishydroxymethyl naphthalenediol.

Examples of the hydroxyanthracene compounds include 1,6-dihydroxymethyl-2,7-dihydroxyanthracene.

Examples of the acyloxymethyl group-containing compound include compounds in which a part or all the methylol groups of the methylol group-containing compound are acyloxymethylated.

Preferable compounds among these compounds are trimethylolphenol, bishydroxymethyl-p-cresol, tetramethylol bisphenol A, hexamethylol derivatives of Tris P-PA (manufactured by Honshu Chemical Industry Co), or phenol compounds prepared by substituting the methylol groups of the hexamethylol derivatives above with alkoxymethyl group or both the methylol group and alkoxymethyl group.

The compounds including component (c) may be used alone, or as a combination thereof.

While the cross-linking compound is not necessarily contained in the colored curable composition of the invention, the total content is preferably 1 to 70% by mass, more preferably 5 to 50% by mass, and particularly preferably 7 to 30% by mass relative to the solid content of the composition, if any, although the total content of components (a) to (c) are different depending on the material used.

-Polymerizable Monomer-

The colored curable composition of the invention favorably contains at least one polymerizable monomer. The polymerizable monomer is contained in the colored curable composition mainly when the colored curable composition is a negative-type composition.

The polymerizable monomer may added to a positive-type system containing a naphthoquinone diazide compound together with a photopolymerization initiator as will be described hereinafter in order to enhance the hardness of the pattern formed. The polymerizable monomer will be described below.

The polymerizable monomer is preferably a compound having at least one ethylene group capable of addition polymerization with a boiling point of not lower than 100° C. at an normal pressure. Examples of the polymerizable monomer include monofunctional acrylate and methacrylate such as polyethyleneglycol mono(meth)acrylate, propyleneglycol mono(meth)acrylate and phenoxyethyl(meth)acrylate; polyethyleneglycol di(meth)acrylate, trimethylolethane tri(meth)acrylate, neopentylglycol di(meth)acrylate, pentaerythritol tri(meth)acrylate, pentaerythritol tetra(meth)acrylate, pentaerythritol penta(meth)acrylate, dipentaerythritol hexa(meth)acrylate, hexanediol(meth)acrylate, trimethylolpropane tri(acryloyoxypropyl)ether and tri(acryloyloxyethyl)isocyanurate; compounds prepared by ethyleneoxide or propylene oxide addition to polyfunctional alcohol such as glycerin and trimethylolethane followed by (meth)acrylation; urethane acrylates described in JP-B NO. 48-41708 and JP-A Nos. 50-6034 and 51-37193; polyester acrylate described in JP-A No. 48-64183 and JP-B Nos. 49-43191 and 52-30490; polyfunctional acrylate and methacrylate such as epoxyacrylates obtained by reaction of epoxy resins and (meth)acrylic acid; and mixtures thereof.

Other examples include those introduced as photocurable monomers and oligomers in Journal of the Japanese Adhesive Association, Vol. 20, No. 7, p300 to 308.

The content of the polymerizable monomer is preferably 0.1 to 90% by mass, more preferably 1.0 to 80% by mass, and particularly preferably 2.0 to 70% by mass relative to the solid content.

-Radiation Sensitive Compound-

The colored curable composition of the invention may favorably contain at least one radiation sensitive compound. While the radiation sensitive compound according to the invention is a compound capable of starting a chemical reaction such as radical generation, acid generation and base generation in response to a radiation such as UV, deep UV, visible light, IR light and electron beam, it is used for permitting the coating film to be insoluble to an alkali developer by making the binder insoluble by cross-linking, polymerization or decomposition of acidic groups, or for initiating polymerization of the polymerizable monomer or oligomer and crosslinking by the cross-linking agent in the coating film.

A photopolymerization initiator may be favorably contained in the colored curable composition when the composition is a negative-type composition, while a naphthoquinone diazide compound is favorably contained when the composition is a positive-type composition.

-Photopolymerization Initiator-

The photopolymerization initiator is contained when the colored curable composition of the invention is a positive-type composition.

While the photopolymerization initiator is not particularly restricted so long as it is able to polymerize the polymerizable monomer, it is preferably selected considering its characteristics, initiation efficiency, absorption wavelength, availability and cost.

The photopolymerization initiator may be further added to the positive composition containing the naphthoquinone diazide compound in order to enhance hardness of the pattern formed.

Examples of the photopolymerization initiator include at least one active halogen compound selected from halomethyloxadiazole compounds and halomethyl-s-triazine compounds, 3-aryl substituted coumarin compounds, rofin dimers, benzophenone compounds, acetophenone compounds and their derivatives, cyclopentadiene-benzene-iron complex and its derivative, and oxime compounds.

Examples of the active halogen compound such as halomethyloxadiazole include 2-halomethl-5-vinyl-1,3,4-oxadiazole compounds, 2-trichloromethyl-5-styryl-1,3,4-oxadiazole, 2-trichloromethyl-5-(p-cyanostyryl)-1,3,4-oxadiazole, and 2-trichloromethyl-5-(p-methoxystyryl)-1,3,4-oxadiazole described in JP-B No. 57-6096.

Examples of the photopolymerization initiator include vinyl-halomethyl-s-triazine compounds describe in JP-B No. 59-1281, 2-(naphtho-1-yl)-4,6-bis-halomethyl-s-triazine compounds and 4-(p-aminophenyl)-2,6-di-halomethyl-s-triazine compounds described in JP-A No. 53-133428.

Other examples include 2,4-bis(trichloromethyl)-6-p-methoxystyryl-s-troazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-troazine, 2-(4-methoxy-naphtho-1-yl)-4,6-bis-trichloromethyl-s-triazine, 2-(4-ethoxy-naphtho-1-yl)-4,6-bis-trichloromrthyl-s-triazine, 2-(4-butoxy-naphtho-1-yl)-4,6-bis-trichloromethyl-s-triazine, 2-[4-(2-mehtoxyethyl)-naphtho-1-yl]-4,6-bis-trichloromehyl-s-triazine, 2-[4-(2-ethoxyethyl)-naphtho-1-yl]-4,6-bis-trichloromethyl-s-triazine, 2-[4-(2-butoxyethyl)-naphtho-1-yl]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphto-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine,4-[p-N,N-di(ethoxycarbonylmethyl)aminophenyl]-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloroethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl)]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl]-2,6-di(trichloromethyl)-s-triazine,4-[m-N,N-di(ethoxycarbonylmethyl)aminophenyl]-2,6-si(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di (ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine,4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-[m-bromo-p-N-ethoxycarbonylmethylaminophenyl]-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, and 4-(o-fluoro-p-N-chloroethylaminophenyl)-2,6-di(trichloromethyl)-s-triazine.

Other examples favorably used include TAZ series compounds manufactured by Midori Chemical Co. such as TAZ-107, TAZ-110, TAZ-104, TAZ-109, TAZ-140, TAZ-204, TAZ-113, TAZ-123 and TAZ-104; T-series compounds manufactured by Panchim Co. such as T-OMS, T-BMP, T-R and T-B; IRGACURE series compounds manufactured by Ciba Specialty Chemicals such as IRGACURE 369, IRGACURE 784, IRGACURE 651, IRGACURE 184, IRGACURE 500, IRGACURE 1000, IRGACURE 149, IRGACURE 819 and IRGACURE 261; DAROCURE series compounds manufactured by Ciba Specialty Chemicals such as DAROCURE 1173; 4,4'-bis(diethylamino)-benzophenone, 2-(O-benzoyloxime)-1-[4-(phenylthio)phenyl]-1,2-octanedione, 2-benzyl-2-dimethylamino-4-morpholinobutylophenone, 2,2-dimethoxy-2-phenyl acetophenone, 2-(o-chlorophenyl)-4,5-diphenylimidazolyl dimer, 2-(o-fluorophenyl)-4,5-diphenylimidazolyly dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methylmercaptophenyl)-4,5-diphenylimidazolyl dimer, and benzoin isopropylether.

Known photopolymerization initiators other than the photopolymerization initiators described above may be used together in the colored curable composition of the invention.

Specific examples thereof include vicinal polyketol aldonil compounds disclosed in U.S. Pat. No. 2,367,660, α-carbonyl compounds disclosed in U.S. Pat. Nos. 2,367,661 and 2,367,670, acyloin ether disclosed in U.S. Pat. No. 2,448,828, aromatic acyloin compounds substituted with a-hydrocarbons disclosed in U.S Pat. No. 2,722,512, polynucleic quinone compounds disclosed in U.S. Pat. Nos. 3,046,127 and 2,951,758, combinations of triaryl imidazole dimer and p-aminophenylketone disclosed in U.S. Pat. No. 3,549,367, benzothiazole compounds/trihalomethyl-s-triazine compounds disclosed in JP-B No. 51-48516.

The content of the photopolymerization initiator in the colored curable composition is preferably 0.01 to 50% by mass, more preferably 1 to 30% by mass, and particularly preferably 1 to 20% by mass relative to the solid content of the polymerizable monomer. When the content is less than 0.01% by mass, polymerization is hardly advanced. When the content exceeds 50% by mass, the molecular weight may be lowered to cause the film strength weak although the polymerization ratio increases.

A sensitizer and photostabilizing agent may be used together with the photopolymerization initiator.

Specific examples thereof include benzoin, benzoin methylether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methyl xanthone, 2-methoxy xanthone, 2-ethoxy xanthone, thioxanthone, 2,4-diethylthioxanthone, acrydone, 10-butyl-2-chloroacrydone, benzyl, dibenzalacetone, p-(dimethylamino)phenyl styrylketone, p-(dimethylamino)phenyl-p-methyl styrylketone, benzophenone, p-(dimethylamino)benzophenone (or Michller's ketone), p-(diethylamino)benzophenone, benzoanthrone, benzothiazole compounds described in JP-B No. 51-48516, and Tinuvin 11130 and 400.

It is preferable to further add a thermal polymerization inhibitor. Examples of the useful compound include hydroquinone, p-methoxyphenol, di-t-butyl-p-cresol, pyrogallol, t-butyl catechol, benzoquinone, 4,4'-thiobis(3-methyl-6-t-butylphenol), 2,2'-methylenebis(4-methyl-6-t-butylphenol), and 2-mercaptobenzoimidazole.

-Naphthoquinone Diazide Compound-

The naphthoquinone diazide compound contained in the colored curable composition when the composition is of positive-type will be described below.

The naphthoquinone diazide compound is a compound having at least one o-quinone diazide group. Examples of the compound include o-naphthoquinonediazide-5-sulfonic acid ester, o-naphthoquinonediazide-5-sulfonic acid amide, o-naphthoquinonediazide-4-sulfonic acid ester, and o-naphthoquinonediazide-4-sulfonic acid amide. These ester and amide compounds can be manufactured by known methods, for example, by using abphenol compound described by formula (I) in JP-A Nos. 2-84650 and 3-49437.

When the colored curable composition is of a positive-type, the alkali-soluble phenol resin and cross-linking agent are preferably dissolved in an organic solvent in the proportion of 2 to 50% by mass and 2 to 30% by mass, respectively. The contents of the naphthoquinonediazide compound and dye are preferably 2 to 30% by mass and 2 to 50% by mass, respectively, relative to the mass of the solution dissolving the binder and cross-linking agent.

-Solvent-

Solvents may be usually contained in preparing the colored curable resin composition of the invention. While the solvent is not particularly restricted so long as the solvent satisfies solubility of each component of the composition and applicability of the colored curable composition, it is preferably selected by taking solubility of the binder, applicability and safety into consideration.

Specific examples of the preferable solvent include esters such as ethyl acetate, n-butyl acetate, isobutyl acetate, amyl formate, isoamyl acetate, isobutyl acetate, butyl propionate, isopropyl butylate and ethyl butylate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, 3-oxypropionic acid alkyl esters such as methyl3-oxypropionate and ethyl3-oxypropionate; methyl3-methoxypropionate, ethyl3-mehtoxypropionate, methyl3-ethoxypropionate and ethyl3-ethoxypropionate, methyl2-oxypropinate, ethyl2-oxypropionate, propyl2-oxypropionate, methyl2-methoxypropionate, ethyl2-methoxypropinate, propyl2-methoxypropionate, methyl2-ethoxypropinate, ethyl2-ethoxypropionate, methyl2-oxy-2-methyl propionate, ethyl2-oxy-2-methylpropionate, methyl2-methoxy-2-methylpropionate and ethyl2-ethoxy-2-methylpropionate, methyl pyruvate, ethyl pyruvate, propyl pyruvate; methyl acetoacetate; methyl2-oxobutanate and ethyl2-oxobutanate; ethers such as diethyleneglycol dimethylether, tetrahydrofuran, ethyleneglycol monomethylether, ethyleneglycol monoethylether, methylcellosolve acetate, ethylcellosolve acetate, diethyleneglycol monomethylether, diethyleneglycol monoethylether, diethyleneglycol monobutylether, propyleneglycol methylether, propyleneglycol methylether acetate, propyleneglycol ethylether acetate, and propyleneglycol propylether acetate; ketones such as methylethyl ketone, cyclohexanone, 2-heptanone and 3-heptanone; and aromatic hydrocarbons such as toluene and xylene.

More preferable examples among them include methyl3-ethoxypropionate, ethyl3-ethoxypropionate, ethylcellosolve acetate, ethyl lactate, diethyleneglycol dimethylether, butyl acetate, methyl3-methoxypropionate, 2-heptanone, cyclohexanone, ethylcarbitol acetate, butylcarbitol acetate, propyleneglycol methylether and propyleneglycol methylether acetate.

-Various Additives-

Various additives, for example fillers, polymer compounds other than those described above, surfactants, adhesion accelerating agents, antioxidants, UV absorbing agents and aggregation inhibitors may be contained in the colored curable composition of the invention.

Specific examples of the additives include fillers such as glass and alumina; polymer compounds such as polyvinyl alcohol, polyacrylic acid, polyethyleneglycol monoalkylether and polyfluoroalkyl acrylate, other than the binder resins; nonionic, cationic and anionic surfactants; adhesion accelerating agents such as vinyl trimethoxysilane, vinyl triethoxysilane, vinyl-tris(2-methoxyethoxy) silane, N-(2-aminoethyl)-3-aminopropylmethyl dimethoxysilane, N-(2-aminoethyl)-3-aminopropyl trimethoxysilane, 3-aminopropyl triethoxysilane, 3-glycidoxypropyl trimethoxysilane, 3-glycidoxypropylmethyl dimethoxysilane, 2-(3,4-epoxycyclohexyl)ethyl trimethoxysilane, 3-chloropropylmethyl dimethoxysilane, 3-chloropropyl trimethoxysilane, 3-methacryloxypropyl trimethoxysilane and 3-mercaptopropyl trimethoxysilane; antioxidants such as 2,2-thiobis(4-methyl-6-t-butylphanol) and 2,6-di-t-butylphenol; UV absorbing agents such as 2-(3-t-butyl-5-methyl-2-hydroxyphenyl)-5-chlorobenzotriazole and alkoxybenzophenone; and aggregation inhibitor such as sodium polyacrylate.

For accelerating alkali solubility of non-irradiated parts (non-image parts) in order to improve developability of the colored curable composition of the invention, organic carboxylic acids, preferably low molecular weight carboxylic acids with a molecular weight of not larger than 1000, may be added.

Specific examples thereof include aliphatic monocarboxylic acids such as formic acid, acetic acid, propionic acid, butyric acid, valeric acid, pivalic acid, caproic acid, diethylacetic acid, enathic acid and caprylic acid; aliphatic dicarboxylic acids such as oxalic acid, malonic acid, succinic acid, glutaric acid, adipic acid, pimelic acid, suberic acid, azelaic acid, cebacic acid, brassylic acid, methylmalonic acid, ethylmalonic acid, dimethylmalonic acid, methylsuccinic acid, tetramethylsuccinic acid and citraconic acid; aliphatic tricarbonic acids such as tricarballylic acid, aconitic acid and camphoronic acid; aromatic monocarboxylic acid such as benzoic acid, toluylic acid, cumic acid, hemellitic acid and mesitylenic acid; aromatic polycarboxylic acid such as phthalic acid, isophthalic acid, terephthalic acid, trimellitic acid, trimesic acid, mellophanic acid and pyromellitic acid; phenylacetic acid, hydratropic acid, hydrocinnamic acid, mandelic acid, phenylsuccinic acid, atropic acid, cinnamic acid, methyl cinnamate, benzyl cinnamate, cinnamilydenic acid, coumalic acid, umbellic acid and other carboxylic acid.

The colored curable composition of the invention can be favorably used for forming colored pixels of a color filter used for a liquid crystal display element (LCD) or a solid-state image pickup element (for example CCD and CMOS), and for manufacturing printing inks, ink-jet inks and paints.

<Color Filter, and Manufacturing Method Thereof>

The colored curable composition of the invention as hitherto described can be used for manufacturing the color filter of the invention. The color filter of the invention can be prepared by applying the colored curable composition of the invention on a substrate by, for example, rotary coating, flow coating or roll coating to form a layer of the radiation sensitive composition, exposing the layer to light through a given mask, and developing with a developer (image forming) to form a negative-type or positive-type colored pattern (resist pattern). A curing step for curing the colored pattern by application of heat and/or light may be provided, if necessary. UV light such as g-ray, h-ray and i-ray may be favorably used as the light or radiation used in this process.

When the colored curable composition is a positive-type composition, a step for post-baking the colored pattern after forming the image may be provided.

In forming the color filter comprising a desired number of hues, the image forming steps (and a curing step if necessary) are repeated depending on the number of the desired hues when the filter is of negative-type, and the image forming steps and post-baking steps are repeated depending on the desired number of the hues when the filter is of positive-type.

Examples of the substrate include those used for liquid crystal display elements such as soda glass, PYREX glass, quarts glass and these materials on which a transparent conductive film is coated, and a substrate of a photoelectric conversion element used for the image pickup element such as silicone substrate and complementary metal oxide semiconductor device (CMOS). Black stripes for dividing the pixels may be formed on these substrates.

An undercoat layer may be provided, if necessary, on the substrate for improving adhesivity of the substrate with upper layers, for preventing diffusion of substances, and for flattening the surface of the substrate.

While the developer used for manufacturing the color filter of the invention is required to be able to dissolve the non-cured portion of the colored curable composition of the invention, any developers may be used so long as they comprises a composition not dissolving the irradiated portion (cured portion). Specific examples of the developer include combinations of various organic solvents and aqueous alkaline solutions. Examples of the organic solvents include the solvents described above used for preparing the composition of the invention.

The aqueous alkaline solution is prepared, for example, by dissolving an alkaline compound such as sodium hydroxide, potassium hydroxide, sodium carbonate, sodium silicate, sodium metasilicate, aqueous ammonia, ethylamine, diethylamine, dimethylethanolamine, tetramethylammonium hydroxide, tetraethylammonium hydroxide, choline, pyrrole, piperidine and 1,8-diazabicyclo-[5.4.0]-7-undecene in a concentration of 0.001 to 10% by mass, preferably 0.01 to 1% by mass. The substrate is usually washed with water when such developer comprising the aqueous alkali solution is used.

The color filter of the invention can be used for the liquid crystal display element and solid-state image pickup element, and is particularly favorable for a high resolution CCD element and CMOS element having a pixel number of exceeding 1,000,000 pixels. The color filter is used by being disposed between a light receiving part of pixels in CCD and a light converging micro-lens.

EXAMPLES

While the present invention is described in detail with reference to examples, the invention is by no means restricted to these examples.

Example 1

(1) Preparation of Resist Solution

A resist solution was prepared by mixing and dissolving the following materials:

| | |
|---|---|
| propyleneglycol monomethylether acetate (PGMEA) | 5.20 parts |
| ethyl lactate (EL) | 52.6 parts |
| binder (41% EL solution of benzyl methacrylate/methacrylic acid/2-hydroxyethyl methacrylate (molar ratio = 60:20:20)) | 30.5 parts |
| dipentaerythritol hexaacrylate | 10.2 parts |
| polymerization inhibitor (p-methoxyphenol) | 0.006 parts |
| fluorine base surfactant (F-475, manufactured by Dai-Nippon Ink Chemical Industry Co.) | 0.80 parts |
| photopolymerization initiator TAZ-107 (manufactured by Midori Chemical Co.) | 0.58 parts |

(2) Preparation of Glass Substrate with Undercoat Layer

A glass substrate (trade name: CORNING 1737) was washed with 0.5% aqueous NaOH solution by applying ultrasonic wave, followed by washing with water and baking for dehydration (200° C./20 minutes).

Then, the resist solution obtained in (1) was applied on a cleaned glass substrate with a thickness of 2 μm using a spin coater, and the resist layer was dried for 1 hour by heating at 220° C. to form a cured film (undercoat layer).

(3) Preparation of Dye Resist Solution (Colored Curable Composition (Negative-type))

The exemplified compound M-1 (0.75 g; the compound represented by formula (I)) were mixed with and dissolved in the resist solution (9.4 g) obtained in (1) above to prepare a dye resist solution (colored curable composition (negative-type) solution).

(4) Exposure and Development of Dye Resist (Image Forming)

The dye resist solution obtained in (3) above was applied on the undercoat layer of the glass substrate having the undercoat layer obtained in (2) above with a thickness of 1.0 μm using a spin coater, followed by pre-baking at 100° C. for 120 seconds.

Then, the coating layer was irradiated with a light having a wavelength of 365 nm at a luminous exposure of 500 mJ/cm$^2$ through a mask with a line width of 20 μm. After the exposure, the layer was developed at 25° C. for 40 seconds using 60% CD-2000 developer (trade name, manufacture by Fuji Film Arch Co.). The resist layer was spray-dried after rinsing with running water for 30 seconds.

A good pattern was obtained on a magenta color filter.

(5) Evaluation

Storability of the dye resist solution prepared as described above, and heat resistance and light fastness of the coating film applied on the glass substrate using the dye resist solution were evaluated as follows. The results of evaluation are shown in Table 1 below.

(1) Storability

The amount of precipitation of foreign substances after storing the dye resist solution for 1 month at room temperature was evaluated by the naked eye according to the evaluation criteria below.

<Evaluation Criteria>

A: no precipitation was observed

B: slight precipitation was observed

C: precipitation was evident (2) Heat Resistance

The glass substrate coated with the dye resist solution was heated at 200° C. for 1 hour on a hot plate. Color difference ΔEab before and after the heat resistance test was measured for evaluation according to the criteria below. The smaller ΔEab value shows better heat resistance.

<Evaluation Criteria>

A: ΔEab<5

B: 5≦ΔEab≦10

C: 10<ΔEab (3) Light Fastness

The glass substrate coated with the dye resist solution was irradiated with light from a xenon lamp with 50,000 lux for 20 hours (corresponding to 1,000,000 Lux·h), and the color difference ΔEab before and after the light fastness test was measured. The smaller ΔEab value shows better light fastness.

<Evaluation Criteria>

A: ΔEab<3

B: 3≦ΔEab≦10

C: 10<ΔEab

Examples 2 to 15

The dye resist solution was prepared by the same method as in Example 1, except that the dye used in (3) of Example 1 was changed to an equimolar each of the dye in Table 1 (a half of equimolar of the dye in Example 1 in Examples 11 to 14). The results are shown in Table 1.

Comparative Examples 1 to 3

The dye resist solution was prepared by the same method as in Example 1, except that the dye was changed as shown in Table 1. The results are shown in Table 1.

Comparative Examples 4 to 6

The dye resist solution was prepared by the same method as in Example 1, except that exemplified compound M-1 of the invention was changed to an equimolar each of comparative dyes A, B and C. The results are shown in Table 1.

Comparative Dye-A (D-5 in JP-A No. 2002-256164, the disclosure of which is incorporated by reference herein)

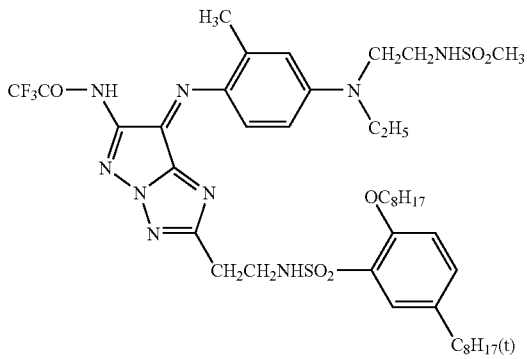

Comparative Dye-B (D-8 in JP-A No. 2002-256164, the disclosure of which is incorporated by reference herein)

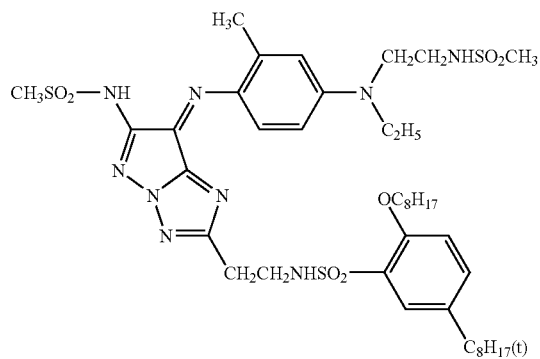

Comparative Dye-C (D-107 in JP-A No. 2002-256164, the disclosure of which is incorporated by reference herein)

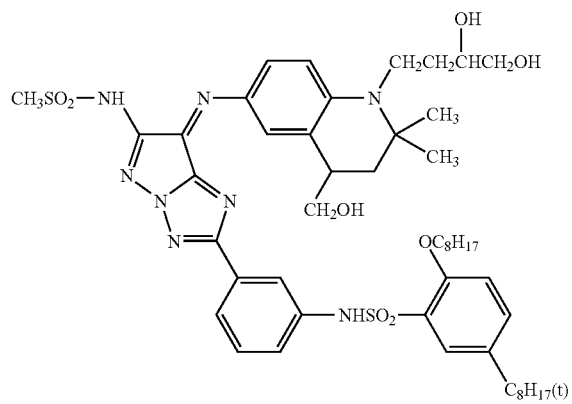

TABLE 1

|  | No. of Exemplified Dye | Storability | Heat Resistance | Light Fastness | Note |
|---|---|---|---|---|---|
| Example 1 | M-1 | A | A | A | This Invention |
| Example 2 | M-2 | A | A | A | This Invention |
| Example 3 | M-9 | A | A | A | This Invention |
| Example 4 | M-15 | B | A | B | This Invention |
| Example 5 | M-21 | A | A | A | This Invention |
| Example 6 | M-23 | B | A | A | This Invention |
| Example 7 | M-26 | B | A | A | This Invention |
| Example 8 | M-28 | B | A | B | This Invention |
| Example 9 | M-42 | A | A | A | This Invention |
| Example 10 | M-62 | A | A | A | This Invention |
| Example 11 | M-75 | B | A | A | This Invention |
| Example 12 | M-76 | A | A | A | This Invention |
| Example 13 | M-77 | A | A | A | This Invention |
| Example 14 | M-78 | A | A | A | This Invention |
| Example 15 | M-83 | A | A | A | This Invention |
| Comparative Example 1 | C.I. Acid Violet 17 | C | C | C | Comparative Example |
| Comparative Example 2 | C.I. Acid Violet 49 | C | C | C | Comparative Example |
| Comparative Example 3 | C.I. Acid Blue 83 | C | C | C | Comparative Example |
| Comparative Example 4 | Comparative Dye A | C | C | B | Comparative Example |
| Comparative Example 5 | Comparative Dye B | C | B | B | Comparative Example |
| Comparative Example 6 | Comparative Dye C | C | B | B | Comparative Example |

The results in Table 1 shows that the colored curable composition in the example using the dye according to the invention is excellent in storability in its solution as compared with the comparative example using the dye other than that in the invention. The image pattern formed using the colored curable composition is also excellent in heat resistance and light fastness.

Example 16

(1) Preparation of Colored Curable Composition (Positive-type)

| | |
|---|---|
| ethyl lactate (EL) | 30 parts |
| resin P-1 (described below) | 3.0 parts |
| naphthoquinone diazide compound N-1 (see below) | 1.8 parts |
| cross-linking agent: hexamethoxymethylol modified melamine | 0.6 parts |
| light acid generating agent: TAZ-107 (trade name, manufactured by Midori Chemical Co.) | 1.2 parts |
| fluorine base surfactant (trade name; F-475, manufactured by Dai-Nippon Ink Chemical Co.) | 0.0005 parts |
| exemplified dye M-1 of the invention | 1.5 parts |

The above components were mixed and dissolved to obtain a colored curable composition (positive-type).

Resin P-1 and naphthoquinone diazide compound (N-1) was synthesized as follows.

-Synthesis of Resin P-1-

Benzyl methacrylate (70.0 g), methacrylic acid (13.0 g), 2-hydroxyethyl methacrylate (17.0 g) and 2-methoxypropanol (600 g) were placed in a three-necked flask equipped with a stirrer, reflux condenser and thermometer, and the mixture was stirred at 65° C. for 10 hours in a nitrogen stream while a catalytic quantity of a polymerization initiator V-65 (trade name, manufactured by Wako Pure Chemical Industry Co.) was added. The resin solution obtained was dripped into 20 L of ion-exchange water with vigorous stirring to obtain a white powder. This white powder was dried at 40° C. for 24 hours in vacuum to obtain 145 g of resin P-1. The weight average molecular weight Mw and number average molecular weight Mn of the resin were found to be 28,000 and 11,000, respectively, from the GPC measurement.

-Synthesis of Naphthoquinone Diazide Compound (N-1)-

Trisp-PA (42.45 g; trade name, manufactured by Honshu Chemical Co.), o-nephthoquinonediazide-5-sulfonylchloride (61.80 g) and acetone (300 ml) were placed in a three-necked flask, and triethylamine (24.44 g) was dripped in the solution in 1 hour. After completing dripping and stirring for additional 2 hours, the reaction solution was poured into a large volume of water with stirring. Naphthoquinone diazide sulfonate precipitated was filtered with suction, and the precipitate was dried at 40° C. for 24 hours in vacuum to obtain a photosensitive compound N-1.

(2) Exposure and Development of Colored Curable Composition (Imaging Forming)

The colored curable composition prepared above as applied on a glass substrate having an undercoat layer by the same method as in Example 1. A magenta pattern image was obtained after pre-baking, irradiation, development, rinsing and drying. The pattern image was heated thereafter at 180° C. for 5 minutes (post baking). The magenta pattern image had a good rectangular profile.

Storability of the colored curable composition using the dye of the invention, and heat resistance and light fastness of the coating layer were evaluated by the same method a sin Example 1. The results showed that storability, light fastness and heat resistance were excellent.

Examples 17 to 30

A coated substrate of a silicon wafer having an undercoat layer was obtained by the same procedure as in Example 1, except that the glass substrate in Example 1 was changed to the silicon wafer substrate. However, ½ molar equivalent to exemplified dye M-1 in Example 1 was used in Examples 26 to 29.

A light with a luminous energy of 500 mJ/cm² was irradiated on 2 μm square patterns using an i-ray condensed projection exposure apparatus, and the pattern was developed at 23° C. for 60 seconds using 60% CD-2000 developer (trade name, manufactured by Fuji Film Arch Co.). Subsequently, the substrate was spray-dried after rinsing it in running water for 30 seconds to obtain a favorable pattern as the CCD color filter having a rectangular cross section.

Examples 31 to 36

A positive colored curable composition was obtained according to the method in Example 1 described in JP-A No. 2002-14222, the disclosure of which is incorporated by reference, except that C.I. acid blue 83 used in Example 1 according to the method described in JP-A No. 2002-14222 was replaced with equimolar respective dyes (exemplified dyes M-1, N-2, M-21, M-76, M-77 and M-78). A megenta filter layer was formed by the same method as in Example 1 according to the specification of the patent publication above using each composition obtained. However, ½ molar equivalent of dyes were used with respect to M-76, M-77 and M-78.

The compositions and filters in Examples 17 to 36 were evaluated for storability, heat resistance and light fastness. The results had the same tendency as in Example 1.

The invention provides a colored curable composition having high sensitivity, high resolution and high transmittance as well as excellent storability with good hues, high durability against heat and light.

The invention also provides a method for manufacturing a color filter prepared by using the colored curable composition having high resolution and high transmittance, wherein the color filter obtained has good hue and high durability to heat and light. The color filter can be manufactured with high productivity.

What is claimed is:

1. A colored curable composition comprising a binder, a radiation sensitive compound, a polymerizable monomer, and a dye represented by the following formula (I):

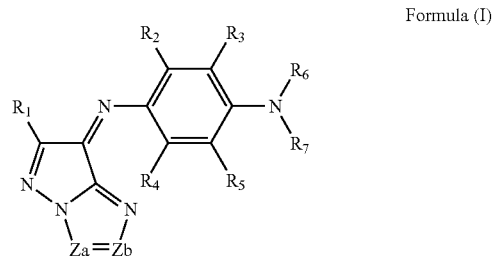

Formula (I)

wherein $R_1$ represents a hydrogen atom or a substituent excluding perfluoroalkyl carbonylamino groups, sulfonamide groups, and sulfamoyl groups; $R_2$ to $R_5$ each independently represent a hydrogen atom or a substituent; $R_6$ and $R_7$ each independently represent an alkyl group, an alkenyl group, or an aryl group; Za and Zb each independently represent —N= or —C($R_8$)=; $R_8$ represents a hydrogen atom, an alkyl group, an aryl group, or a heterocyclic group; and $R_2$ and $R_3$, $R_3$ and $R_6$, $R_4$ and $R_5$, $R_5$ and $R_7$, and/or $R_6$ and $R_7$ may be linked with each other to each independently form a 5-membered, 6-membered, or 7-membered ring.

2. The colored curable composition according to claim 1, further comprising a cross-linking agent.

3. The colored curable composition according to claim 1, further comprising a solvent.

4. The colored curable composition according to claim 1, wherein the binder is alkali-soluble.

5. A color filter prepared by using the colored curable composition according to claim 1.

6. A method for manufacturing a color filter comprising: applying the colored curable composition according to claim 1 on a substrate, exposing the colored curable composition to light through a mask, and developing the colored curable composition to form a pattern.

7. The colored curable composition according to claim 1, wherein the dye is represented by the following formula (II):

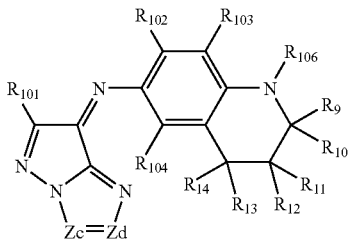

Formula (II)

wherein, $R_{101}$ has the same meaning as $R_1$ in formula (I); $R_{102}$ to $R_{104}$ have the same meanings as $R_2$ to $R_4$, respectively, in formula (I); $R_{106}$ has the same meaning as $R_6$ in formula (I); $R_9$ to $R_{14}$ each independently represent a hydrogen atom or a substituent; and Zc and Zd have the same meanings as Za and Zb, respectively, in formula (I).

8. The colored curable composition according to claim 7, further comprising a cross-linking agent.

9. The colored curable composition according to claim 7, further comprising a solvent.

10. The colored curable composition according to claim 7, wherein the binder is alkali-soluble.

11. A color filter prepared by using the colored curable composition according to claim 7.

12. A method for manufacturing a color filter comprising: applying the colored curable composition according to claim 7 on a substrate, exposing the colored curable composition to light through a mask, and developing the colored curable composition to form a pattern.

13. The colored curable composition according to claim 7, wherein the dye is represented by the following formula (III):

Formula (III)

wherein $R_9$ to $R_{14}$, $R_{101}$ to $R_{104}$, and $R_{106}$ have the same meanings as in formula (II); and $R_{108}$ represents any one of a hydrogen atom, an alkyl group, an alkenyl group, an aryl group, and a heterocyclic group.

14. The colored curable composition according to claim 13, further comprising a cross-linking agent.

15. The colored curable composition according to claim 13, further comprising a solvent.

16. The colored curable composition according to claim 13, wherein the binder is alkali-soluble.

17. A color filter prepared by using the colored curable composition according to claim 13.

18. A method for manufacturing a color filter comprising: applying the colored curable composition according to claim 13 on a substrate, exposing the colored curable composition to light through a mask, and developing the colored curable composition to form a pattern.

* * * * *